United States Patent
Lu et al.

(10) Patent No.: US 11,641,228 B2
(45) Date of Patent: May 2, 2023

(54) FLEXIBLE BEAMFORMING ARCHITECTURE

(71) Applicant: Qualcomm Incorporated, San Diego, CA (US)

(72) Inventors: Dai Lu, San Diego, CA (US); Joseph Patrick Burke, Glenview, IL (US); Juergen Cezanne, Ocean Township, NJ (US); Raju Hormis, New York, NY (US); Ozge Koymen, Princeton, NJ (US); Robert Douglas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 943 days.

(21) Appl. No.: 16/509,890

(22) Filed: Jul. 12, 2019

(65) Prior Publication Data
US 2021/0013940 A1    Jan. 14, 2021

(51) Int. Cl.
*H04B 7/06* (2006.01)
*H04B 1/44* (2006.01)
*H04B 1/58* (2006.01)

(52) U.S. Cl.
CPC ............. *H04B 7/0617* (2013.01); *H04B 1/44* (2013.01); *H04B 1/58* (2013.01); *H04B 7/0686* (2013.01)

(58) Field of Classification Search
CPC ...... H04B 7/0617; H04B 7/0686; H04B 1/44; H04B 1/58
USPC ........................................................ 370/329
See application file for complete search history.

(56) References Cited

U.S. PATENT DOCUMENTS

| 2016/0142922 A1* | 5/2016 | Chen ..................... H04W 16/28 375/267 |
| 2018/0375221 A1 | 12/2018 | Petersson et al. |
| 2021/0013909 A1* | 1/2021 | Ono ......................... H04B 1/40 |

FOREIGN PATENT DOCUMENTS

WO    2019006745 A1    1/2019

OTHER PUBLICATIONS

International Search Report and Written Opinion—PCT/US2020/039277—ISA/EPO—dated Sep. 23, 2020.
(Continued)

*Primary Examiner* — Chi Tang P Cheng
(74) *Attorney, Agent, or Firm* — Colby Nipper/Qualcomm

(57) ABSTRACT

An apparatus is disclosed for implementing a flexible beamforming architecture. In an example aspect, the apparatus comprises an antenna array comprising a first antenna element with a first feed port and a second antenna element with a second feed port. The apparatus also comprises a wireless transceiver with a first dedicated transceiver path coupled to the first feed port and a second dedicated transceiver path coupled to the second feed port. The wireless transceiver also comprises a flexible beamforming network configured to selectively be in a first configuration that couples both the first dedicated transceiver path and the second dedicated transceiver path to a first intermediate transceiver path of the wireless transceiver, and be in a second configuration that connects the first dedicated transceiver path to the first intermediate transceiver path and connects the second dedicated transceiver path to a second intermediate transceiver path of the wireless transceiver.

30 Claims, 14 Drawing Sheets

(56) References Cited

OTHER PUBLICATIONS

Ahmed I., et al., "A Survey on Hybrid Beamforming Techniques in 5G: Architecture and System Model Perspectives," IEEE Communications Surveys & Tutorials, Fourth Quarter 2018, vol. 20, No. 4, pp. 3060-3097.

Kutty S., et al., "Beamforming for Millimeter Wave Communications: An Inclusive Survey," IEEE Communications Surveys & Tutorials, Second Quarter 2016, vol. 18, No. 2, pp. 949-973.

* cited by examiner

FLEXIBLE BEAMFORMING ARCHITECTURE

TECHNICAL FIELD

This disclosure relates generally to wireless transceivers and, more specifically, to implementing a flexible beamforming architecture that enables a wireless transceiver to selectively perform analog beamforming, digital beamforming, or hybrid beamforming.

BACKGROUND

To increase transmission rates and throughput, cellular and other wireless networks are using signals with higher frequencies and smaller wavelengths. As an example, fifth-generation (5G)-capable devices or next-generation wireless local area network (WLAN)-capable devices communicate with networks using frequencies that include those at or near the extremely-high frequency (EHF) spectrum (e.g., frequencies greater than 24 gigahertz (GHz)) with wavelengths at or near millimeter wavelengths (mmW). However, these signals present various technological challenges, such as higher path loss as compared to signals for earlier generations of wireless communications. In certain scenarios, it can be difficult for a mmW wireless signal to travel far enough to make cellular or WLAN communications feasible at these higher frequencies.

SUMMARY

An apparatus is disclosed that implements a flexible beamforming architecture. Using switches and coupler circuits (e.g., combiners and splitters), a flexible beamforming network dynamically connects or couples dedicated transceiver paths to intermediate transceiver paths. Different configurations of the flexible beamforming network enable a wireless transceiver to selectively have an analog beamforming architecture, a digital beamforming architecture, or a hybrid beamforming architecture. Performance of these different beamforming architectures can vary in terms of power consumption, responsiveness to changing conditions of a transmission channel (e.g., due to changes in Doppler spread and multipath fading), and ability to compensate for non-linear phase fronts. As such, the wireless transceiver can dynamically enable different beamforming architectures via the flexible beamforming network and match a particular beamforming technique to a given environment or situation.

In an example aspect, an apparatus that implements a flexible beamforming architecture is disclosed. The apparatus comprises an antenna array and a wireless transceiver. The antenna array comprises a first antenna element with a first feed port and a second antenna element with a second feed port. The wireless transceiver comprises a set of dedicated transceiver paths, a set of intermediate transceiver paths, and a flexible beamforming network. The set of dedicated transceiver paths comprises a first dedicated transceiver path coupled to the first feed port and a second dedicated transceiver path coupled to the second feed port. The set of intermediate transceiver paths comprises a first intermediate transceiver path and a second intermediate transceiver path. The flexible beamforming network is coupled between the set of dedicated transceiver paths and the set of intermediate transceiver paths. The flexible beamforming network is configured to selectively be in a first configuration that couples both the first dedicated transceiver path and the second dedicated transceiver path to the first intermediate transceiver path, and be in a second configuration that connects the first dedicated transceiver path to the first intermediate transceiver path and connects the second dedicated transceiver path to the second intermediate transceiver path.

In an example aspect, an apparatus that implements a flexible beamforming architecture is disclosed. The apparatus comprises an antenna array and a wireless transceiver. The antenna array comprises a first antenna element with a first feed port and a second antenna element with a second feed port. The wireless transceiver comprises a set of dedicated transceiver paths and a set of intermediate transceiver paths. The set of dedicated transceiver paths comprises a first dedicated transceiver path coupled to the first feed port and a second dedicated transceiver path coupled to the second feed port. The set of intermediate transceiver paths comprises a first intermediate transceiver path and a second intermediate transceiver path. The wireless transceiver also includes beamforming flexibility means for selectively coupling both the first dedicated transceiver path and the second dedicated transceiver path to the first intermediate transceiver path based on a first configuration and connecting the first dedicated transceiver path to the first intermediate transceiver path and the second dedicated transceiver path to the second intermediate transceiver path based on a second configuration. The beamforming flexibility means is coupled between the set of dedicated transceiver paths and the set of intermediate transceiver paths.

In an example aspect, a method for operating a flexible beamforming architecture is disclosed. The method comprises coupling, based on a first configuration, both a first dedicated transceiver path of a radio-frequency integrated circuit and a second dedicated transceiver path of the radio-frequency integrated circuit to a first intermediate transceiver path of the radio-frequency integrated circuit. Based on the first configuration, the method comprises operating an analog beamformer in an active state. The method also comprises connecting, based on a second configuration, the first dedicated transceiver path to the first intermediate transceiver path and connecting the second dedicated transceiver path to a second intermediate transceiver path of the radio-frequency integrated circuit. The method further comprises operating at least a portion of a digital beamformer in the active state based on the second configuration.

In an example aspect, an apparatus that implements a flexible beamforming architecture is disclosed. The apparatus includes a set of dedicated transceiver paths, a set of intermediate transceiver paths, and a flexible beamforming network. The set of dedicated transceiver paths comprises a first dedicated transceiver path and a second dedicated transceiver path. The set of intermediate transceiver paths comprises a first intermediate transceiver path and a second intermediate transceiver path. The flexible beamforming network is coupled between the set of dedicated transceiver paths and the set of intermediate transceiver paths. The flexible beamforming network comprises a first coupler circuit coupled to the first intermediate transceiver path, a first dedicated switch, and a second dedicated switch. The first dedicated switch comprises a first pole coupled to the first dedicated transceiver path, a first throw coupled to the first coupler circuit, and a second throw coupled to the first intermediate transceiver path. The second dedicated switch comprises a second pole coupled to the second dedicated transceiver path, a third throw coupled to the first coupler circuit, and a fourth throw coupled to the second intermediate transceiver path.

BRIEF DESCRIPTION OF DRAWINGS

FIG. 2-1 illustrates an example radio-frequency integrated circuit (RFIC) of a wireless transceiver that implements a flexible beamforming architecture.

FIG. 2-2 illustrates an example analog beamformer, an example digital beamformer, and an example hybrid beamformer that implement a flexible beamforming architecture.

FIG. 4-1 illustrates example types of antenna elements that are coupled to dedicated transceiver paths within a flexible beamforming architecture.

FIG. 4-2 illustrates example sub-arrays of antenna elements that can be coupled to different intermediate transceiver paths of a flexible beamforming architecture.

FIG. 5-1 illustrates an example flexible beamforming network that selectively enables analog beamforming and digital beamforming.

FIG. 5-2 illustrates another example flexible beamforming network that selectively enables analog beamforming and hybrid beamforming.

FIG. 6-1 illustrates an example flexible beamforming network that selectively enables analog beamforming, digital beamforming, and hybrid beamforming.

FIG. 6-2 illustrates an example analog beamforming configuration of a flexible beamforming network.

FIG. 6-3 illustrates an example digital beamforming configuration of a flexible beamforming network.

FIG. 6-4 illustrates an example hybrid beamforming configuration of a flexible beamforming network.

DETAILED DESCRIPTION

Figure 1:
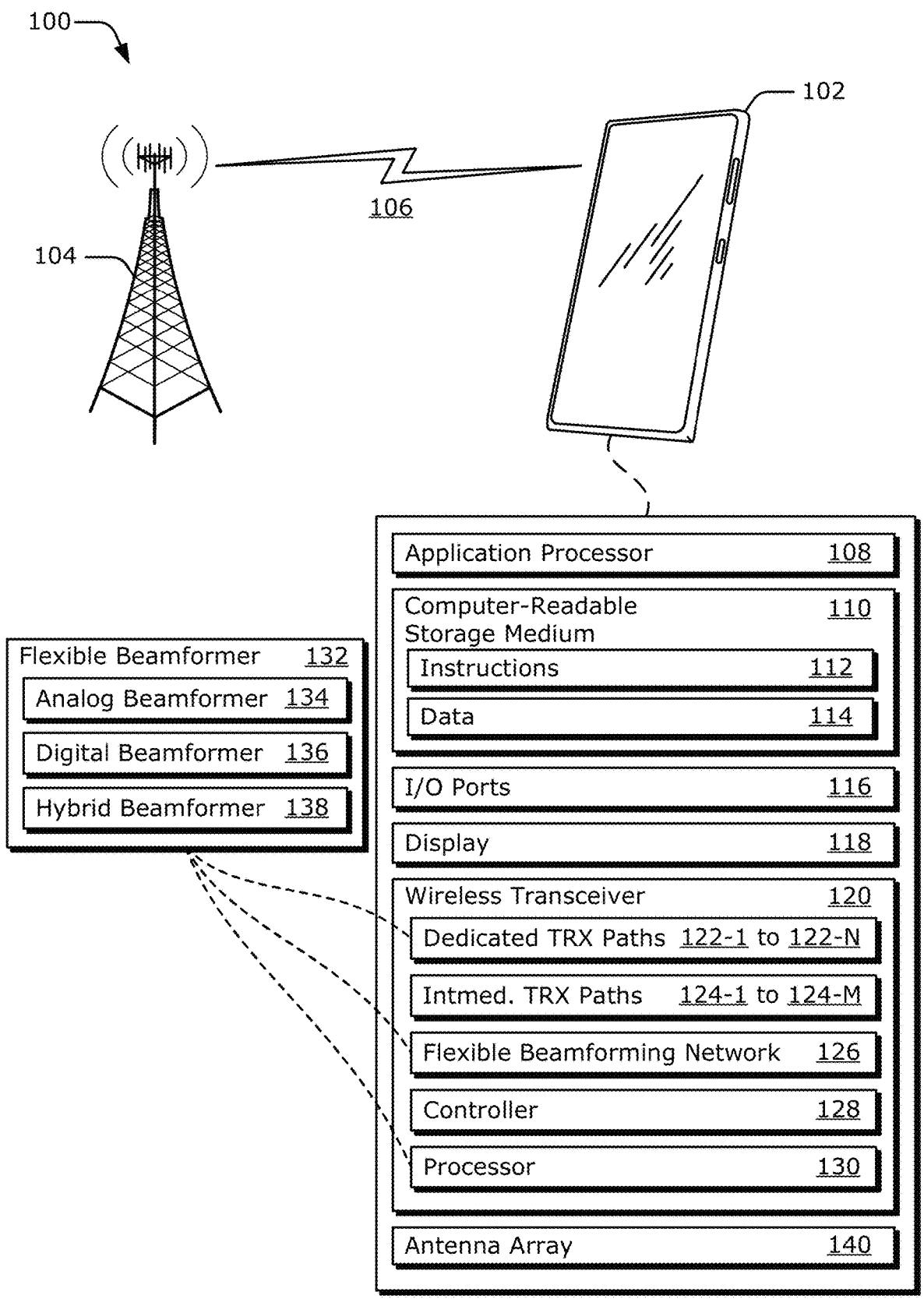
FIG. 1 illustrates an example operating environment for utilizing a flexible beamforming architecture.

Cellular and other wireless networks can use signals with higher frequencies and smaller wavelengths to increase transmission rates and throughput. Signals within the extremely-high frequency (EHF) spectrum (e.g., frequencies greater than 24 gigahertz (GHz)) with wavelengths at or near millimeter wavelengths, however, experience higher path loss compared to signals at lower frequency ranges. As such, it can be difficult for a mmW wireless signal to travel far enough to make cellular or WLAN communications feasible at these higher frequencies.

To address this issue, some electronic devices employ beamforming techniques to increase signal strength or sensitivity in a particular spatial direction. Beamforming techniques adjust amplitudes and/or phases of signals that are transmitted or received via different antenna elements of an antenna array. These adjustments determine a constructive and destructive interference pattern that occurs once the signals are combined together over-the-air or within a wireless transceiver. An angular direction that the constructive interference occurs at increases a signal-to-noise ratio of the combined signals. Applying beamforming techniques to mmW signals can therefore concentrate energy in a particular direction to compensate for the higher path loss. In this way, the electronic device can communicate with other devices over farther distances.

There are challenges to beamforming signals, however. Implementing some beamforming techniques can increase power consumption, cost, and complexity of the electronic device relative to other designs that do not employ beamforming techniques. Furthermore, a transmission channel can experience different amounts of Doppler spread or different types of multipath fading. Doppler spread can result from movement of a transmitting electronic device or a receiving electronic device, and this Doppler spread shifts frequencies of mmW signals that propagate through the transmission channel Multipath fading can distort amplitudes and phases of the mmW signals. These distortions can result in a non-linear phase front at the antenna array of the electronic device. As a result, both Doppler spread and multipath fading can make it challenging to determine appropriate beamforming parameters to improve communication performance. These challenges can be addressed by different types of beamforming architectures.

An analog beamforming architecture, for example, can consume less power and be less complex than a digital beamforming architecture, but it may not be able to respond as quickly to changes in conditions of the transmission channel, such as changes in Doppler spread or multipath fading. It may also be challenging for the analog beamforming architecture to compensate for a non-linear phase front. In contrast, a digital beamforming architecture can efficiently adjust beamforming parameters to address changing channel conditions due to Doppler spread and multipath fading, but it may consume more power and add additional cost and complexity relative to the analog beamforming architecture. Performance of a hybrid beamforming architecture can be in between that of the analog beamforming architecture and the digital beamforming architecture in terms of power consumption, responsiveness, and ability to compensate for a non-linear phase front.

Some electronic devices implement one type of beamforming architecture, such as the analog beamforming architecture, the digital beamforming architecture, or the hybrid beamforming architecture. Consequently, performance of these electronic devices is limited by the associated benefits and costs of the corresponding single beamforming architecture.

In contrast, an apparatus is disclosed that implements a flexible beamforming architecture. Using switches and coupler circuits (e.g., combiners and splitters), a flexible beamforming network dynamically connects or couples dedicated transceiver paths to intermediate transceiver paths. Different configurations of the flexible beamforming network enable a wireless transceiver to selectively have an analog beamforming architecture, a digital beamforming architecture, or a hybrid beamforming architecture. Performance of these different beamforming architectures can vary in terms of power consumption, responsiveness to changing conditions of a transmission channel (e.g., due to changes in Doppler spread and multipath fading), and ability to compensate for non-linear phase fronts. As such, the wireless transceiver can dynamically enable different beamforming architectures via the flexible beamforming network and match a particular beamforming technique to a given environment or situation.

FIG. 1 illustrates an example environment 100 for utilizing a flexible beamforming architecture. In the environment 100, a computing device 102 communicates with a base station 104 through a wireless communication link 106 (wireless link 106). In this example, the computing device 102 is depicted as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, wearable computer, server, network-attached storage (NAS) device, smart appliance or other internet of things (IoT) device, medical device, vehicle-based communication system, radar, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, server device, terrestrial television broadcast tower, access point, peer-to-peer device, mesh network node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102, or an uplink of other data or control information communicated from the computing device 102 to the base station 104. The wireless link 106 may be implemented using any suitable communication protocol or standard, such as second-generation (2G), third-generation (3G), fourth-generation (4G), or fifth-generation (5G) cellular; IEEE 802.11 (e.g., Wi-Fi™); IEEE 802.15 (e.g., Bluetooth™); IEEE 802.16 (e.g., WiMAX™); and so forth. In some implementations, the wireless link 106 may wirelessly provide power and the base station 104 may comprise a power source.

As shown, the computing device 102 includes an application processor 108 and a computer-readable storage medium 110 (CRM 110). The application processor 108 may include any type of processor, such as a multi-core processor, that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Alternately or additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless local area network (LAN) (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via at least one antenna array 140. Components of the wireless transceiver 120 can include amplifiers, switches, mixers, analog-to-digital converters, filters, and so forth for conditioning the communication signals (e.g., for generating or processing signals). The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate receiver and transmitter entities. Additionally or alternatively, the wireless transceiver 120 can be realized using multiple or different sections to implement respective receiving and transmitting operations (e.g., separate transmit and receive chains). In general, the wireless transceiver 120 processes data and/or signals associated with communicating data of the computing device 102 over the antenna array 140.

The wireless transceiver 120 also includes dedicated transceiver (TRX) paths 122-1 to 122-N, intermediate transceiver paths 124-1 to 124-M, and a flexible beamforming network 126, where N and M are integers that may or may not be equal to each other. The dedicated transceiver paths 122-1 to 122-N are respectively coupled to feed ports of antenna elements associated with the antenna array 140, and can include components such as amplifiers and phase shifters. Using these components, the dedicated transceiver paths 122-1 to 122-N individually condition signals that are transmitted or received via the feed ports. A signal that is conditioned by one of the dedicated transceiver paths 122-1 to 122-N propagates to or from the antenna element that the dedicated transceiver path is associated with and does not substantially propagate to or from another antenna element.

In some implementations, the intermediate transceiver paths 124-1 to 124-M are selectively associated with individual feed ports of the antenna array 140, similar to the dedicated transceiver paths 122-1 to 122-N. Alternatively, at least one of the intermediate transceiver paths 124-1 to 124-M is associated with two or more feed ports of the antenna array 140. In some cases, the intermediate transceiver paths 124-1 to 124-M are respectively associated with feed ports of sub-arrays within the antenna array 140. Depending on a type of association that is active, the intermediate transceiver paths 124-1 to 124-M can individually condition signals that are transmitted or received via the feed ports or condition composite signals that are transmitted or received by multiple feed ports. Each of the intermediate transceiver paths 124-1 to 124-M can include components, such as mixers that upconvert signals to a radio frequency or downconvert radio frequency signals. Each intermediate transceiver path 124 can be in an enabled state or a disabled state. In the enabled state, components within the intermediate transceiver path 124 consume power and condition a signal for transmission or reception. In the disabled state, the components within the intermediate transceiver path 124 consume less power relative to the enabled state and do not condition a signal.

The flexible beamforming network 126 includes a network of switches and coupler circuits and provides an interface between the dedicated transceiver paths 122-1 to 122-N and the intermediate transceiver paths 124-1 to 124-M. Using the switches and coupler circuits, the flexible beamforming network 126 can connect or couple the dedicated transceiver paths 122-1 to 122-N to the intermediate transceiver paths 124-1 to 124-M in different configurations that implement an analog beamforming architecture, a digital beamforming architecture, or a hybrid beamforming architecture, as further described with respect to FIGS. 5-1 to 7.

In general, the term "flexible" describes an ability of the flexible beamforming network 126 to be configured in different ways to support different types of beamforming In other words, the flexible beamforming network 126 is configured a first way for analog beamforming, a second way for digital beamforming, and/or a third way for hybrid beamforming Different configurations use or bypass the coupler circuits within the flexible beamforming network 126. For analog beamforming, the coupler circuits combine signals from different antenna elements of the antenna array 140 together in an analog domain. In contrast, for digital beamforming, the coupler circuits are bypassed and the signals from the different antenna elements are combined in a digital domain. For hybrid beamforming, at least one coupler circuit combines signals from different antenna elements of a sub-array within the antenna array 140 together in the analog domain. As such, the flexible beamforming network 126 produces combined signals for respective sub-arrays, which are further combined in the digital domain. The flexible beamforming network 126 can, at least partially, implement a flexible beamforming architecture.

The wireless transceiver 120 also includes a controller 128 and a processor 130. The controller 128 controls a configuration of the flexible beamforming network 126 and can include at least one processor and at least one CRM. The CRM can store computer-executable instructions, such as the instructions 112. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller 128 can be implemented as part of the wireless transceiver 120, a modem, a general-purpose processor, a processor designed to facilitate wireless communication, some combination thereof, and so forth.

The processor 130, which may comprise a modem, can be implemented within or separate from the wireless transceiver 120. Although not explicitly shown, the processor 130 can include a portion of the CRM 110 or can access the CRM 110 to obtain computer-readable instructions. The processor 130 controls the wireless transceiver 120 and enables wireless communication to be performed. The processor 130 can include baseband circuitry to perform high-rate sampling processes that can include analog-to-digital conversion, digital-to-analog conversion, digital beamforming, gain correction, skew correction, frequency translation, and so forth. The processor 130 can provide communication data to the wireless transceiver 120 for transmission. The processor 130 can also process a baseband version of a signal accepted from the wireless transceiver 120 to generate data, which can be provided to other parts of the computing device 102 via a communication interface for wireless communication or proximity detection.

In general, the controller 128 or the processor 130 can control an operational mode of the wireless transceiver 120 or have knowledge of an active operational mode. Different types of operational modes may include different transceiver modes (e.g., a transmit mode or a receive mode), different power modes (e.g., a low-power mode or a high-power mode), different resource control states (e.g., a connected mode, an inactive mode, or an idle mode), different modulation modes (e.g., a lower-order modulation mode such as quadrature phase-shift keying (QPSK) modes or higher-order modulation modes such as 64 quadrature amplitude modulation (QAM) or 256 QAM), and so forth.

The dedicated transceiver paths 122-1 to 122-N, the flexible beamforming network 126, and the processor 130 can, at least partially, implement a flexible beamformer 132. The flexible beamformer 132 can selectively operate as an analog beamformer 134, a digital beamformer 136, or a hybrid beamformer 138 during transmission or reception. In general, a beamformer includes components that adjust amplitudes, phases, or delays of signals across different transceiver paths. The beamformer also includes at least one coupler circuit that splits a signal into multiple signals for different transceiver paths during transmission or combines signals from different transceiver paths during reception. These operations are performed in an analog domain, a digital domain, or both the analog domain and the digital domain via the analog beamformer 134, the digital beamformer 136, or the hybrid beamformer 138, respectively. The different types of beamformers are further described with respect to FIG. 2-2.

Different performances can be realized by activating the analog beamformer 134, the digital beamformer 136, or the hybrid beamformer 138. The analog beamformer 134, for example, can consume less power relative to the digital beamformer 136 and the hybrid beamformer 138. In comparison with the analog beamformer 134, the digital beamformer 136 can more quickly respond to changing conditions of a transmission channel and better compensate for Doppler spread, multipath fading, and non-linear phase fronts. The digital beamformer 136 can also support multiple-input multiple-output (MIMO) techniques, such as spatial diversity or spatial multiplexing. The hybrid beamformer 138 can provide a performance that is in between that of the analog beamformer 134 and the digital beamformer 136. In particular, the hybrid beamformer 138 can consume less power relative to the digital beamformer 136 and be more responsive than the analog beamformer 134. The wireless transceiver 120 is further described with respect to FIG. 2-1.

Figures 1, 2:
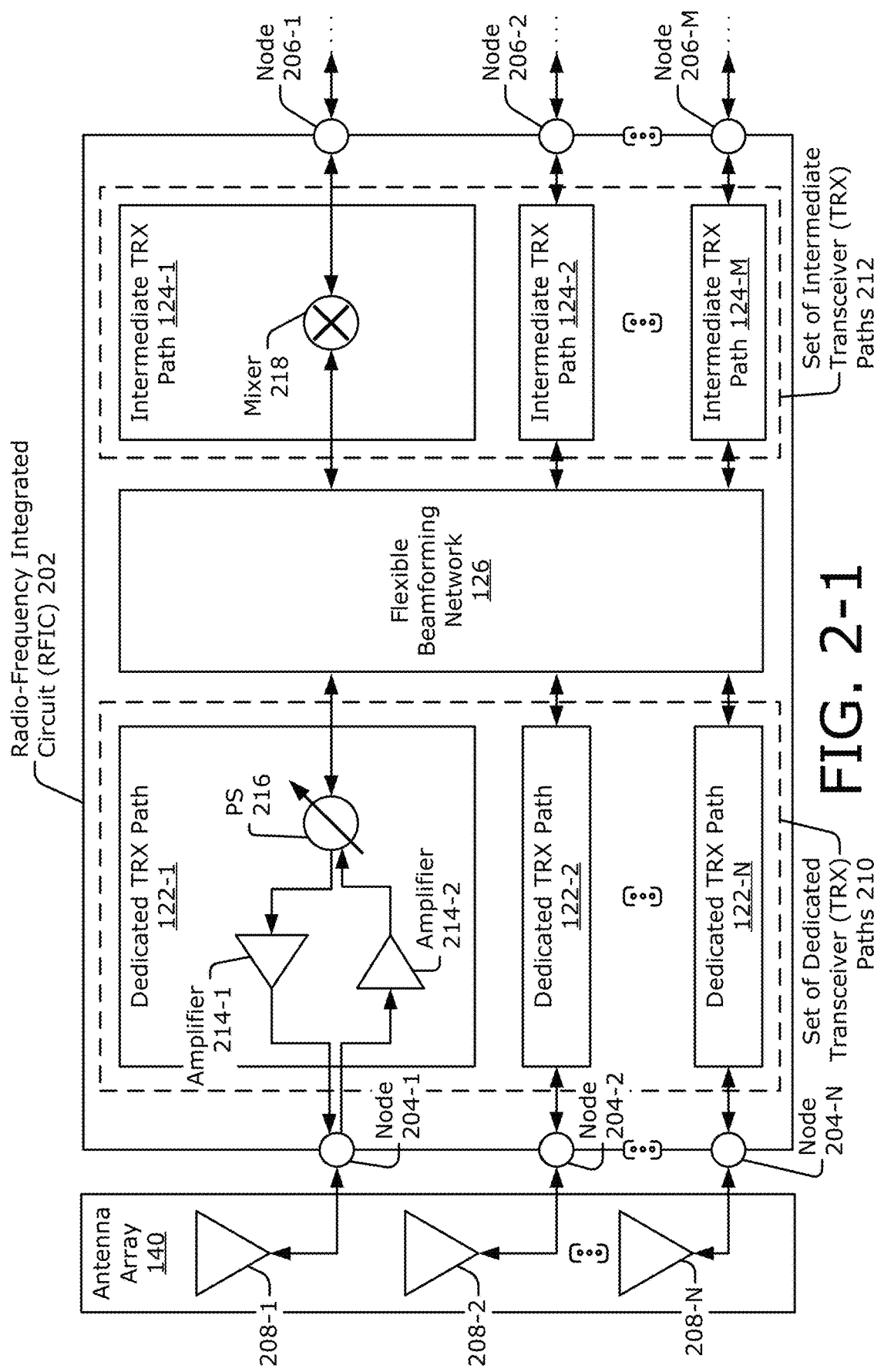
Figure 2:
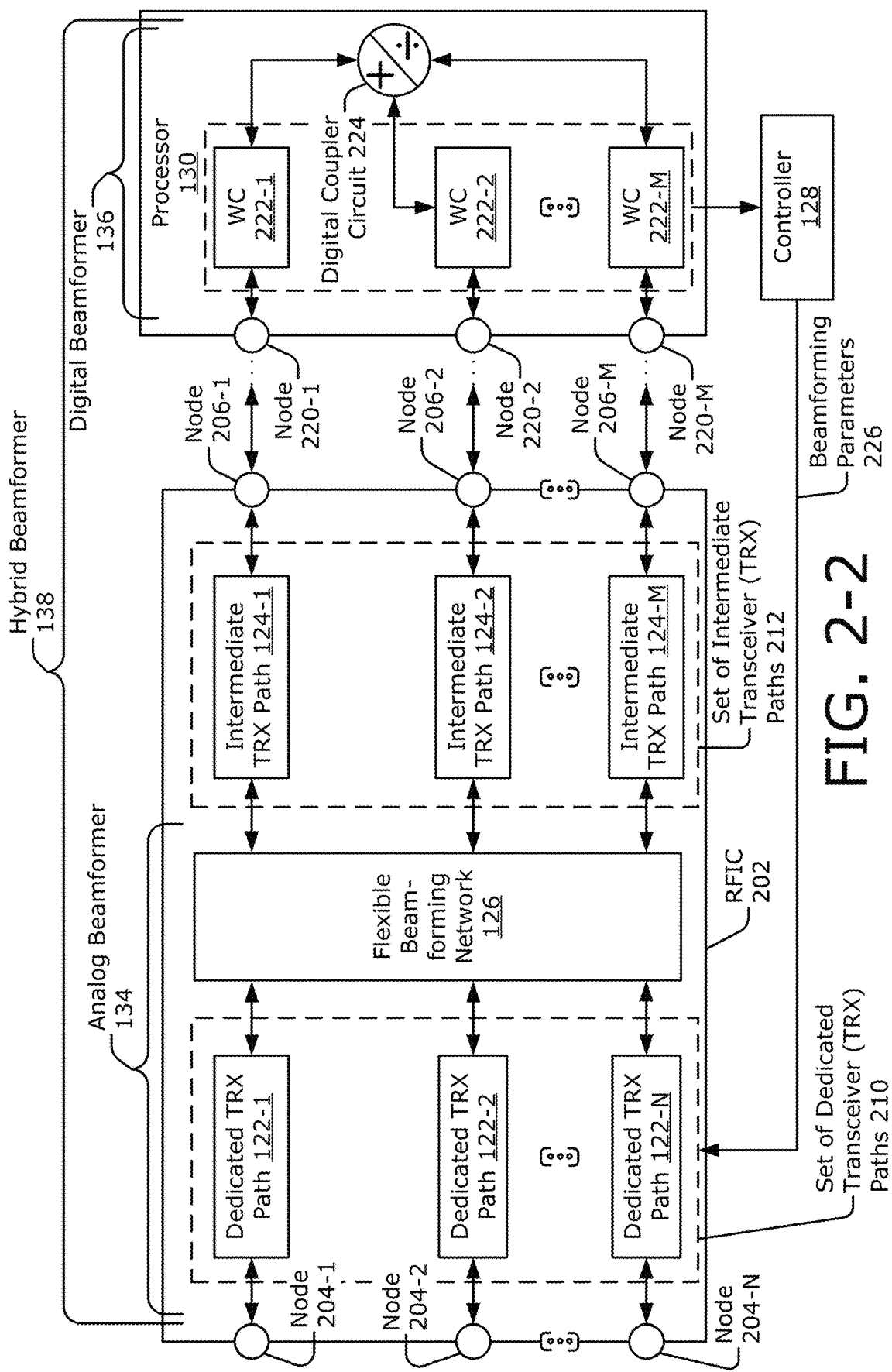
Figure 3:
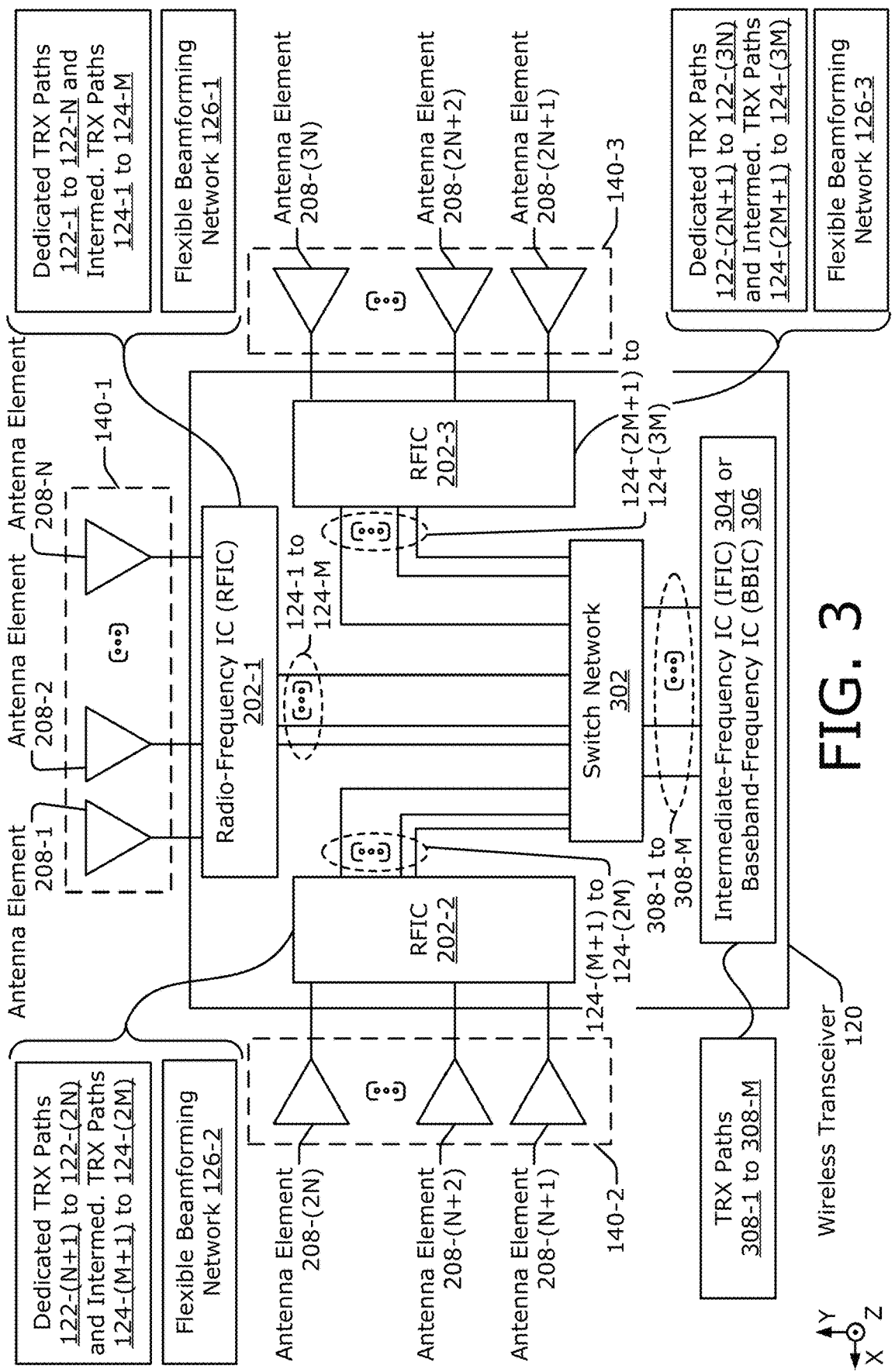
FIG. 3 illustrates an example wireless transceiver that implements a flexible beamforming architecture.

FIG. 2-1 illustrates an example radio-frequency integrated circuit (RFIC) 202 of the wireless transceiver 120 that implements a flexible beamforming architecture. The radio-frequency integrated circuit 202 includes nodes 204-1, 204-2 . . . 204-N and nodes 206-1, 206-2 . . . 206-M. The nodes 204-1 to 204-N are respectively coupled to feed ports of antenna elements 208-1, 208-2 . . . 208-N, which implement the antenna array 140. The nodes 206-1 to 206-M can be coupled to another integrated circuit within the wireless transceiver 120, such as an intermediate-frequency integrated circuit or a baseband-frequency integrated circuit, as shown in FIG. 3.

The radio-frequency integrated circuit 202 includes a set of dedicated transceiver paths 210 with two or more dedicated transceiver paths 122-1 to 122-N, a set of intermediate transceiver paths 212 with two or more intermediate transceiver paths 124-1 to 124-M, and the flexible beamforming network 126. The dedicated transceiver paths 122-1 to 122-N are respectively coupled to the nodes 204-1 to 204-N. The intermediate transceiver paths 124-1 to 124-M are respectively coupled to the nodes 206-1 to 206-M. The flexible beamforming network 126 is coupled between the set of dedicated transceiver paths 210 and the set of intermediate transceiver paths 212.

In the depicted configuration, each dedicated transceiver path 122-1 to 122-N includes a first amplifier 214-1 (e.g., a power amplifier), a second amplifier 214-2 (e.g., a low-noise amplifier), and a phase shifter (PS) 216. The amplifier 214-1 amplifies a signal for transmission and the amplifier 214-2 amplifies a received signal. The phase shifter 216 can include a bidirectional phase shifter or multiple phase shifters for transmission and reception, respectively. The phase shifter 216 optionally adjusts a phase of a signal for either transmission or reception. Although not shown, each dedicated transceiver path 122-1 to 122-N can optionally include a delay circuit, which adjusts a delay of a signal for either transmission or reception.

Each intermediate transceiver path 124-1 to 124-M can include a mixer 218, which provides frequency conversion. During transmission, the mixer 218 upconverts a signal from a lower frequency (e.g., a baseband frequency or an intermediate frequency) to a radio frequency. During reception, the mixer 218 downconverts a signal from the radio frequency to the lower frequency. Although not shown, the intermediate transceiver paths 124-1 to 124-M can include other types of components, such as filters, variable gain amplifiers, and so forth. In other implementations, each dedicated transceiver path 122-1 to 122-N includes the mixer 218. In this case, the intermediate transceiver paths 124-1 to 124-M can be disposed in another integrated circuit, such as the intermediate-frequency integrated circuit or the baseband integrated circuit, and coupled to the flexible beamforming network 126 via the nodes 206-1 to 206-M.

Different configurations of the flexible beamforming network 126 can be enabled to support operation of the analog beamformer 134, the digital beamformer 136, or the hybrid beamformer 138, as further described in FIG. 2-2.

FIG. 2-2 illustrates an example analog beamformer, an example digital beamformer, and an example hybrid beamformer that implement a flexible beamforming architecture. In the depicted configuration, the processor 130 includes nodes 220-1, 220-2 . . . 220-M, which are respectively coupled to the nodes 206-1 to 206-M of the radio-frequency integrated circuit 202. The processor 130 also includes digital weighting circuits (WC) 222-1, 222-2 . . . 222-M and at least one digital coupler circuit 224. The digital weighting circuits 222-1 to 222-M can optionally apply complex weights to adjust amplitudes and/or phases of signals that respectively propagate through the intermediate transceiver paths 124-1 to 124-M. The digital coupler circuit 224 can selectively provide respective split signals to the digital weighting circuits 222-1 to 222-M during transmission and generate a combined signal based on signals provided by the digital weighting circuits 222-1 to 222-M during reception.

Figures 1, 5:
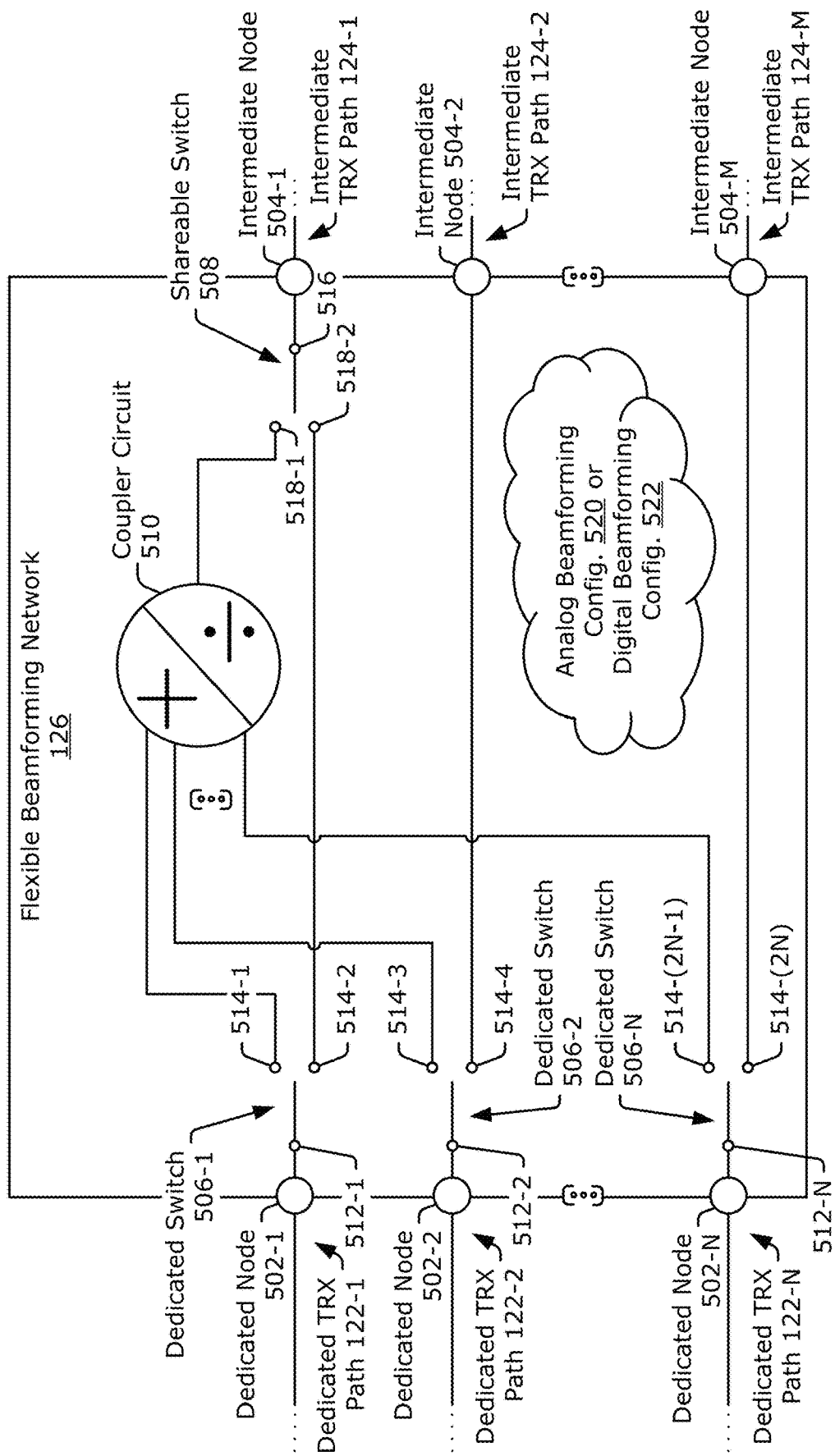
Figures 2, 5:
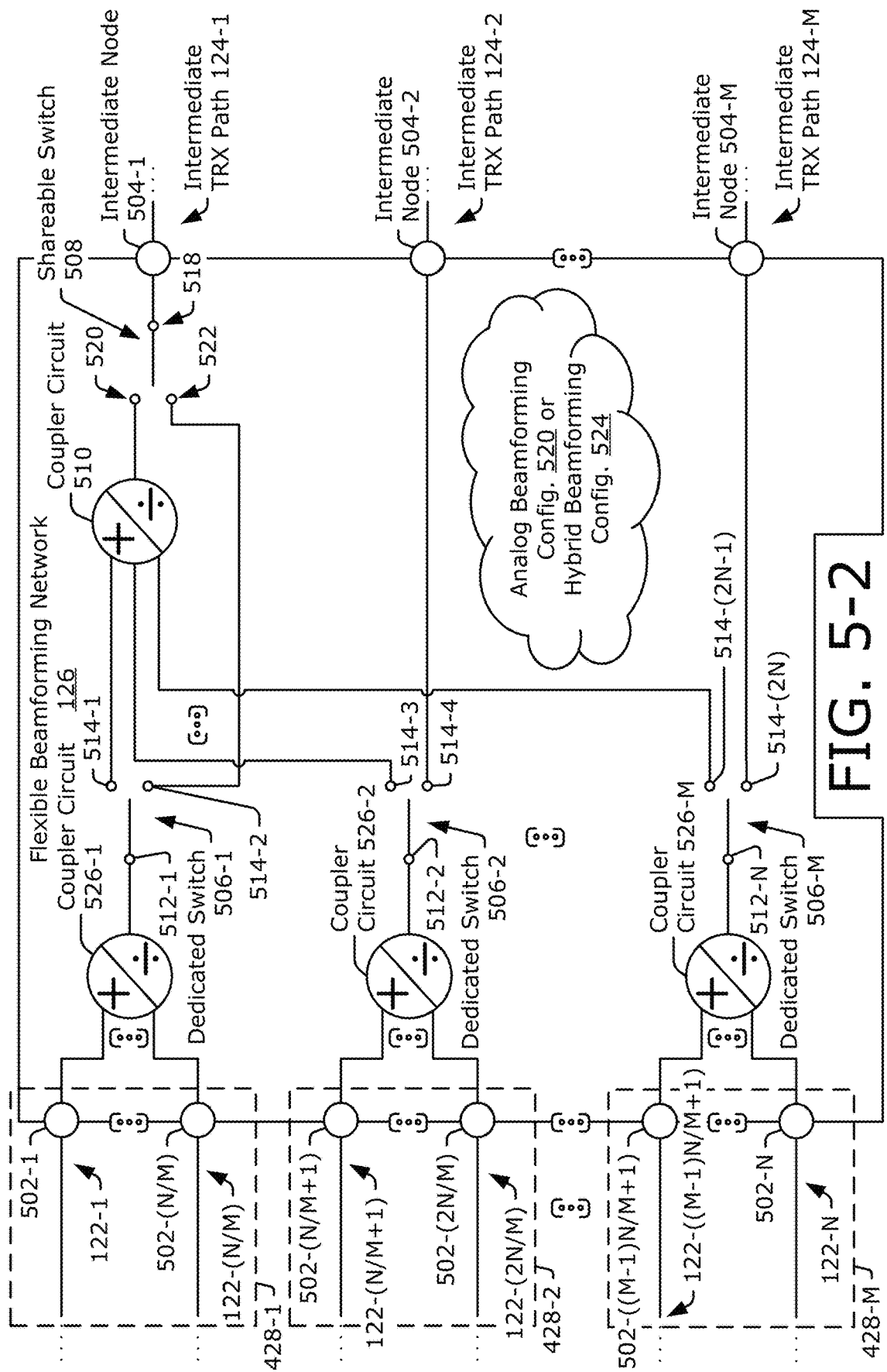

As shown in FIG. 2-2, the analog beamformer 134 is implemented, at least partially, by the phase shifters 216 within the dedicated transceiver paths 122-1 to 122-N and a coupler circuit within the flexible beamforming network 126 (shown in FIG. 5-1). The digital beamformer 136 is implemented, at least partially, by the digital weighting circuits 222-1 to 222-M and the digital coupler circuit 224. The hybrid beamformer 138 is implemented, at least partially, by the components of the analog beamformer 134 and the components of the digital beamformer 136.

The analog beamformer 134, the digital beamformer 136, and the hybrid beamformer 138 can selectively be in an active state or an inactive state. In the active state, the beamformer performs amplitude and/or phase adjustments and coupling. In the inactive state, one or more components of the beamformer can be bypassed or the components do not substantially provide amplitude or phase adjustments.

Figure 7:
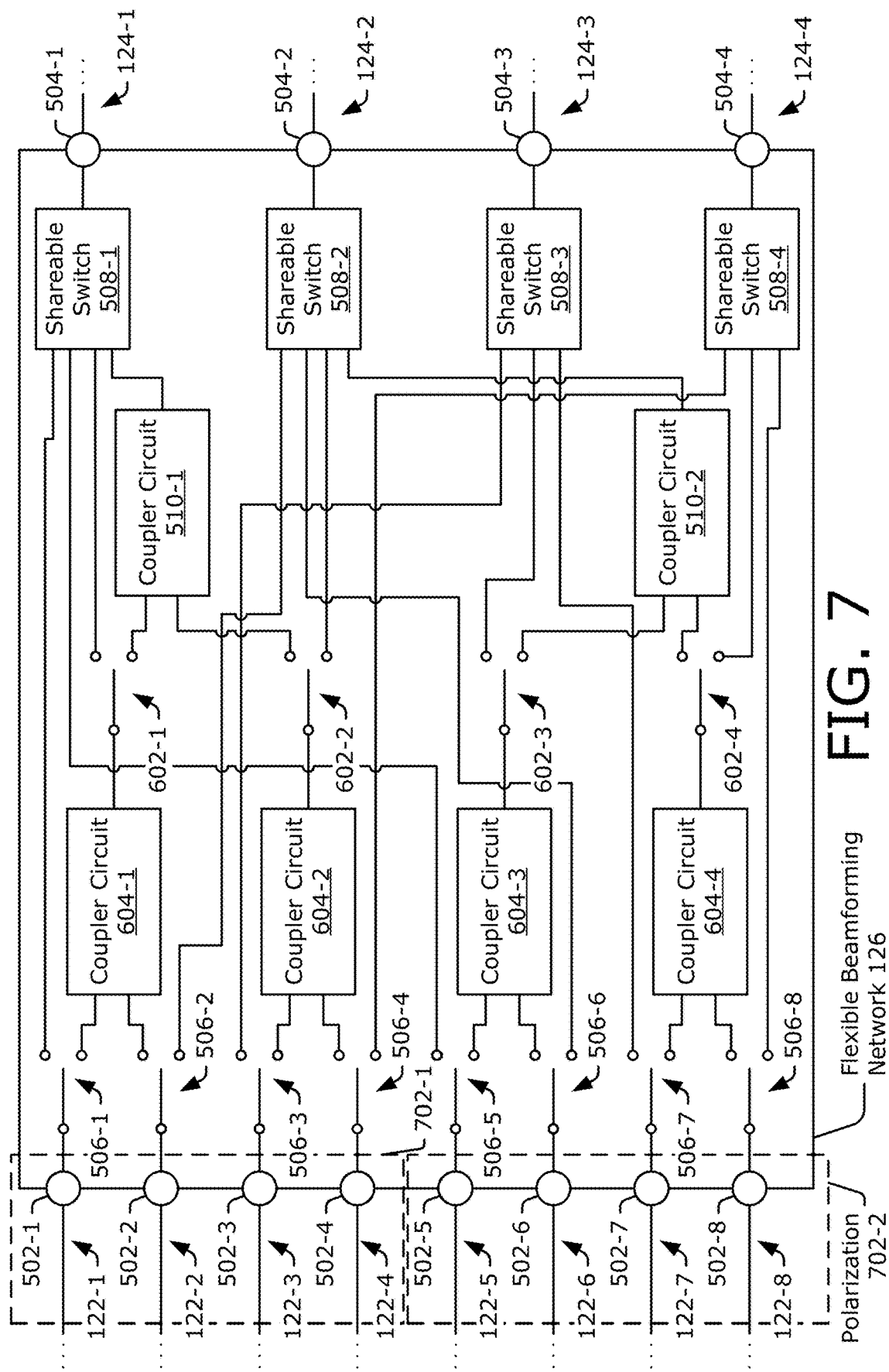
FIG. 7 illustrates another example flexible beamforming network that selectively enables analog beamforming, digital beamforming, and hybrid beamforming.

The flexible beamforming network 126 can be in an analog beamforming configuration, a digital beamforming configuration, or a hybrid beamforming configuration, as further described with respect to FIGS. 5-1 to 7. In the analog beamforming configuration, the flexible beamforming network 126 couples multiple dedicated transceiver paths 122-1 to 122-N to one intermediate transceiver path 124, such as the intermediate transceiver path 124-1. In this case, the other intermediate transceiver paths 124-2 to 124-M can be in the disabled state to conserve power. If the flexible beamforming network 126 is in the analog beamforming configuration, the analog beamformer 134 can be in an active state and the digital beamformer 136 can be in an inactive state to enable analog beamforming.

In the digital beamforming configuration, the flexible beamforming network 126 respectively connects at least a portion of the dedicated transceiver paths 122-1 to 122-N to a portion of the intermediate transceiver paths 124-1 to 124-M such that each intermediate transceiver path 124-1 to 124-M within the portion is connected to a different dedicated transceiver path 122-1 to 122-N. If the flexible beamforming network 126 is in the digital beamforming configuration, the digital beamformer 136 can be in the active state and the analog beamformer 134 can be in the inactive state to enable digital beamforming.

In the hybrid beamforming configuration, the flexible beamforming network 126 couples different portions of the dedicated transceiver paths 122-1 to 122-N to different intermediate transceiver paths 124-1 to 124-M such that two or more intermediate transceiver paths 124-1 to 124-M are each coupled to different groups of two or more dedicated transceiver paths 122-1 to 122-N. For example, the flexible beamforming network 126 couples the intermediate transceiver path 124-1 to the dedicated transceiver paths 122-1 and 122-2 and couples the intermediate transceiver path 124-2 to another two dedicated transceiver paths 122-3 and 122-4 (not explicitly shown in FIG. 2-2). If the flexible beamforming network 126 is in the hybrid beamforming configuration, both the analog beamformer 134 and at least a portion of the digital beamformer 136 can be in the active state to enable hybrid beamforming Any intermediate transceiver path 124-1 to 124-M that is not coupled to a group of dedicated transceiver paths 122-1 to 122-N can be in the disabled state to conserve power.

In some implementations, the controller 128 is coupled to the digital beamformer 136 and obtains beamforming parameters 226 that are applied by the digital weighting circuits 222-1 to 22-M during digital beamforming. The controller 128 can provide these beamforming parameters 226 to the analog beamformer 134, which can use these beamforming parameters 226 to perform analog beamforming.

The controller 128 can dynamically activate different beamformers according to a given environment or situation. If the wireless transceiver 120 is attempting to establish communications with the base station 104 or determine characteristics of a transmission channel (e.g., determine channel state information), the wireless transceiver 120 can perform a search procedure to determine directions to transmit signals to and receive signals from the base station 104. During this procedure, the controller 128 can activate the digital beamformer 136 or the hybrid beamformer 138 to quickly determine these directions. Once communication is established, the controller 128 can activate the analog beamformer 134 to conserve power. The controller 128 can also provide, to the analog beamformer 134, the beamforming parameters 226 associated with the directions determined during the search procedure, as described above.

In a slow multipath fading environment in which amplitudes or phases of a signal do not change significantly during transmission or reception, the controller 128 can activate the analog beamformer 134. Alternatively, if the wireless transceiver 120 is in a mode that uses MIMO techniques, the controller 128 can activate the digital beamformer 136 to enable digital beamforming.

In a fast multipath fading environment in which amplitudes or phases of signals change significantly during transmission or reception, the controller 128 can activate the digital beamformer 136 or the hybrid beamformer 138, which can quickly respond to changing conditions in the transmission channel In some cases, the wireless transceiver 120 can include multiple radio-frequency integrated circuits 202, as further described with respect to FIG. 3.

FIG. 3 illustrates an example wireless transceiver 120 that implements a flexible beamforming architecture. In the depicted configuration, the wireless transceiver 120 includes three radio-frequency integrated circuits (RFICs) 202-1, 202-2, and 202-3, which are respectively coupled to three antenna arrays 140-1, 140-2, and 140-3. The wireless transceiver 120 also includes a switch network 302 and an intermediate-frequency integrated circuit (IFIC) 304 or a baseband-frequency integrated circuit (BBIC) 306. The switch network 302 is coupled between the radio-frequency integrated circuits 202-1 to 202-3 and either the intermediate-frequency integrated circuit 304 or the baseband-frequency integrated circuit 306. If the wireless transceiver 120 implements a superheterodyne transceiver, the switch network 302 provides an interface between the radio-frequency integrated circuits 202-1 to 202-3 and the intermediate-frequency integrated circuit 304. Alternatively, if the wireless transceiver 120 implements a direct conversion transceiver without the intermediate-frequency integrated circuit 304, the switch network 302 provides an interface between the radio-frequency integrated circuits 202-1 to 202-3 and the baseband-frequency integrated circuit 306. Although not explicitly shown, the intermediate-frequency integrated circuit 304 can be coupled to the baseband-frequency integrated circuit 306 to implement the superheterodyne transceiver, and the baseband-frequency integrated circuit 306 can be coupled to the processor 130.

The antenna arrays 140-1 to 140-3 can be located on and oriented towards different sides of the computing device 102. The antenna array 140-1 can be located, for example, on a top side of the computing device 102, the antenna array 140-2 can be located on a left side, and the antenna array 140-3 can be located on a front side. In this manner, the antenna arrays 140-1 to 140-3 and the corresponding radio-frequency integrated circuits 202-1 to 202-3 can respectively transmit or receive signals along a vertical direction or Y axis, a horizontal direction or X axis, or out of the page along a Z axis. In general, antenna arrays and radio-frequency integrated circuits can be disposed around the computing device 102 to enabled transmission and reception of signals in any direction relative to the computing device 102.

The antenna arrays 140-1 to 140-3 respectively include antenna elements 208-1, 208-2 . . . 208-N, antenna elements 208-(N+1), 208-(N+2) . . . 208-(2N), and antenna elements 208-(2N+1), 208-(2N+2) . . . 208-(3N). Each antenna element 208 can include a single feed port or multiple feed ports, as further described with respect to FIG. 4-1. In FIG. 3, the antenna elements 208 are considered to have single feed ports for simplicity. The antenna elements 208 within each antenna array 140-1 to 140-3 can be arranged in a one-dimensional shape (e.g., a line) or a two-dimensional shape (e.g., a square, a rectangle, a circle, a hexagon, and so forth).

The first radio-frequency integrated circuit 202-1 includes dedicated transceiver paths 122-1 to 122-N, intermediate transceiver paths 124-1 to 124-M, and a first flexible beamforming network 126-1. The dedicated transceiver paths 122-1 to 122-N are respectively coupled to feed ports of the antenna elements 208-1 to 208-N. The flexible beamforming network 126-1 is coupled between the dedicated transceiver paths 122-1 to 122-N and the intermediate transceiver paths 124-1 to 124-M. Similarly, the second radio-frequency integrated circuit 202-2 includes dedicated transceiver paths 122-(N+1) to 122-(2N), intermediate transceiver paths 124-(M+1) to 124-(2M), and a second flexible beamforming network 126-2. The dedicated transceiver paths 122-(N+1) to 122-(2N) are respectively coupled to feed ports of the antenna elements 208-(N+1) to 208-(2N). The third radio-frequency integrated circuit 202-3 includes dedicated transceiver paths 122-(2N+1) to 122-(3N), intermediate transceiver paths 124-(2M+1) to 124-(3M), and a third flexible beamforming network 126-3. The dedicated transceiver paths 122-(2N+1) to 122-(3N) are respectively coupled to feed ports of the antenna elements 208-(2N+1) to 208-(3N).

The switch network 302 selectively connects one of the radio-frequency integrated circuits 202-1 to 202-3 to the intermediate-frequency integrated circuit 304 or the baseband-frequency integrated circuit 306. In particular, the switch network 302 selectively couples the intermediate transceiver paths 124-1 to 124-M, the intermediate transceiver paths 124-(M+1) to 124-(2M), or the intermediate transceiver paths 124-(2M+1) to 124-(3M) to the transceiver paths 308-1 to 308-M of the intermediate-frequency integrated circuit 304 or the baseband-frequency integrated circuit 306. In this way, the intermediate-frequency integrated circuit 304 or the baseband-frequency integrated circuit 306 can be shared across the antenna arrays 140-1 to 140-3 to conserve space within the wireless transceiver 120 relative to other design that implement multiple intermediate-frequency integrated circuits 304 or multiple baseband-frequency integrated circuits 306.

Control circuitry (not shown), such as the controller 128 or the processor 130 of FIG. 1, can dynamically select which antenna array 140-1 to 140-3 and radio-frequency integrated circuit 202-1 to 202-3 to activate based on a current situation or environment. If a portion of one of the antenna arrays 140-1 to 140-3 is obstructed (e.g., by a user's appendage), the control circuitry can cause the computing device 102 to transmit and receive signals via one of the unobstructed antenna arrays 140-1 to 140-3. As another example, the control circuitry can select an antenna array 140-1 to 140-3 that provides a target spatial coverage along a direction to the base station 104 of FIG. 1 or supports a particular frequency band. A variety of different types of antenna elements 208 can implement the antenna arrays 140-1 to 140-3, as further described with respect to FIG. 4-1.

Figures 1, 4:
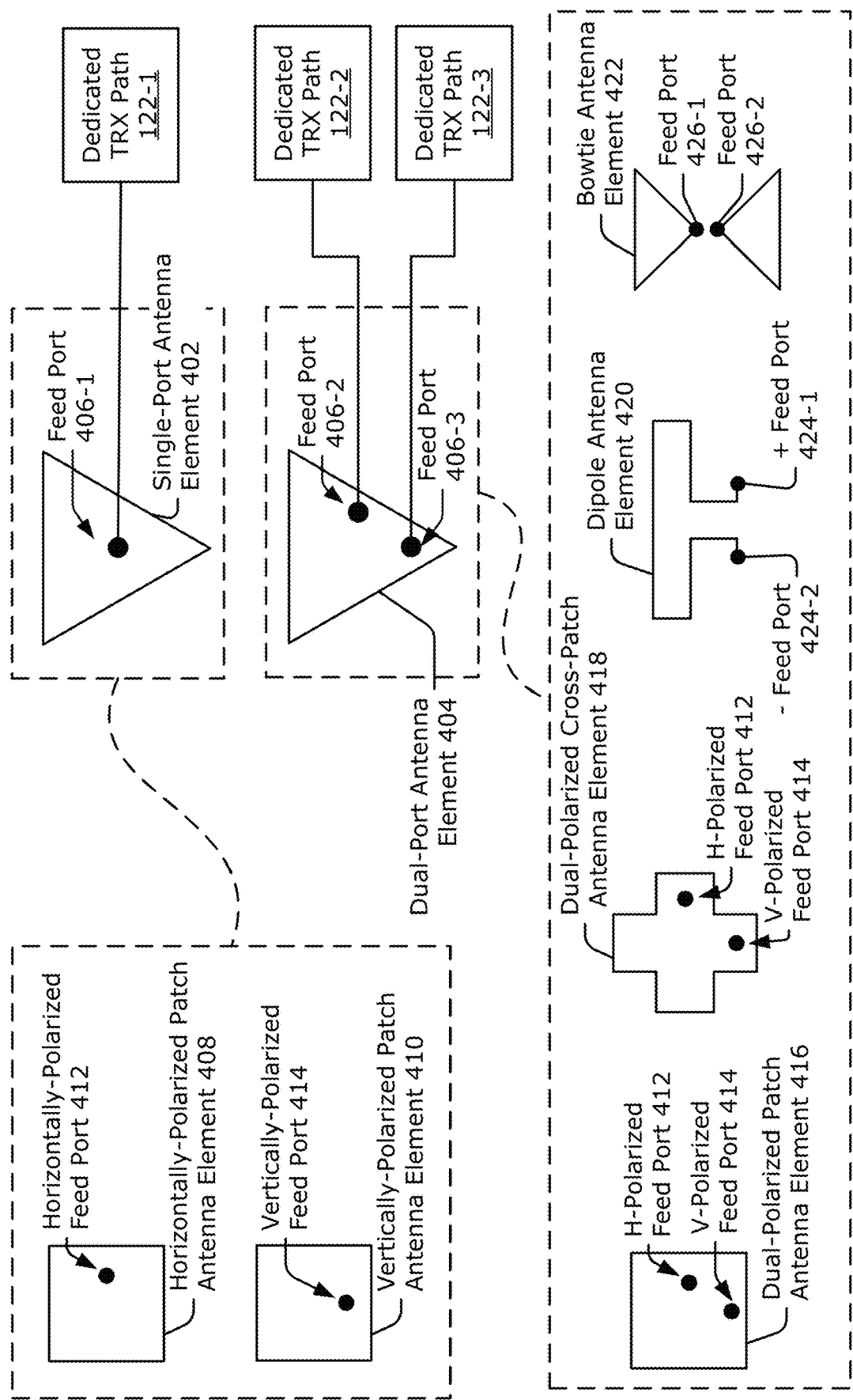
Figures 2, 4:
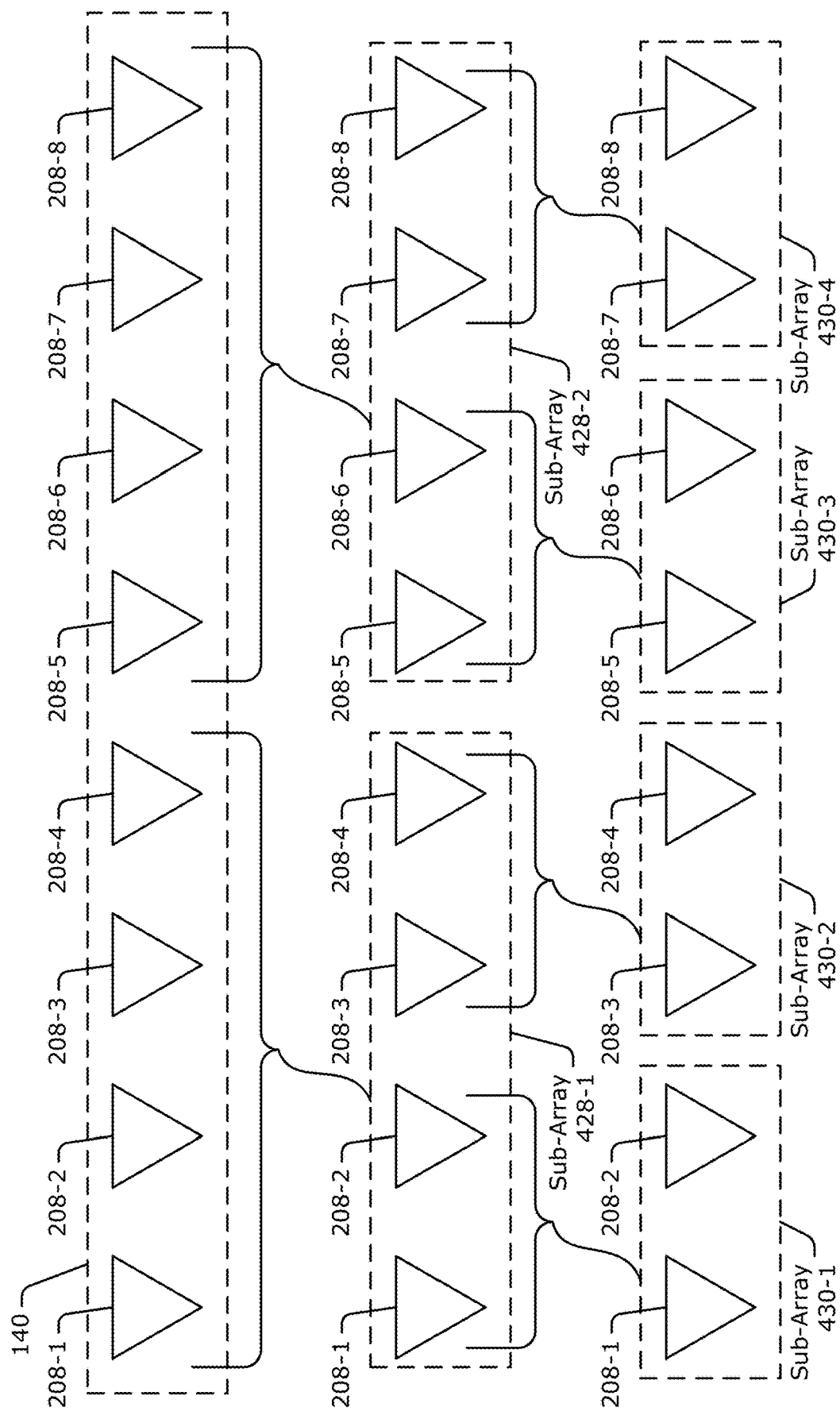

FIG. 4-1 illustrates example types of antenna elements 208 that are coupled to the dedicated transceiver paths 122-1 to 122-N within a flexible beamforming architecture. In general, each feed port of an antenna element 208 is coupled to a dedicated transceiver path 122-1 to 122-N. Depending on a quantity of feed ports, the antenna element 208 is coupled to one or more dedicated transceiver paths 122-1 to 122-N. The antenna element 208 can be implemented as a single-port antenna element 402 or a dual-port antenna element 404, for instance. In some cases, the single-port antenna element 402 is easier or cheaper to implement relative to the dual-port antenna element 404. In other cases, the dual-port antenna element 404 can conserver space within the computing device 102 relative to designs that use two single-port antenna elements 402 to implement the dual-port antenna element 404.

In the depicted configuration, the single-port antenna element 402 includes a feed port 406-1, which is coupled to the dedicated transceiver path 122-1. Example types of single-port antenna elements 402 include a horizontally-polarized patch antenna element 408 and a vertically-polarized patch antenna element 410. The horizontally-polarized patch antenna element 408 includes a horizontally-polarized feed port 412, which transmits or receives horizontally-polarized signals. In contrast, the vertically-polarized patch antenna element 410 includes a vertically-polarized feed port 414, which transmits or receives vertically-polarized signals. Although shown using a square symbol, a shape of the horizontally-polarized patch antenna element 408 and a shape of the vertically-polarized patch antenna element 410 can be rectangular, circular, elliptical, pentagonal, in a form of a cross, and so forth.

The dual-port antenna element 404 includes two feed ports, shown as feed ports 406-2 and 406-3. The feed port 406-2 is coupled to the dedicated transceiver path 122-2 and the feed port 406-3 is coupled to the dedicated transceiver path 122-3. The feed ports 406-2 and 406-3 of the dual-port antenna element 404 can be associated with different polarizations, phases, or directions. Example types of dual-port antenna elements 404 include a dual-polarized patch antenna element 416, a dual-polarized cross-patch antenna element 418, a dipole antenna element 420, and a bowtie antenna element 422.

Both the dual-polarized patch antenna element 416 and the dual-polarized cross-patch antenna element 418 include the horizontally-polarized feed port 412 and the vertically-polarized feed port 414. Using the feed ports 412 and 414, the dual-polarized patch antenna element 416 or the dual-polarized cross-patch antenna element 418 can transmit or receive signals associated with a horizontal polarization, a vertical polarization, a horizontal polarization and a vertical polarization, or a circular polarization. In some implementations, the dual-polarized cross-patch antenna element 418 can conserve space within the computing device 102 relative to designs that use the dual-polarized patch antenna element 416.

The dipole antenna element 420 includes a pair of differential feed ports (e.g., a positive (+) feed port 424-1 and a negative (−) feed port 424-2). Using the differential feed ports 424-1 and 424-2, the dipole antenna element 420 can transmit or receive signals of different phases. The bowtie antenna element 422 includes feed ports 426-1 and 426-2, which are associated with different angular directions. Using the feed ports 426-1 and 426-2, the bowtie antenna element 422 can transmit or receive signals in two different directions.

Although not explicitly shown, the antenna element 208 can alternatively be implemented using a slot antenna element, a crossed bowtie antenna element, an inverted-F antenna, other types of microstrip antenna elements, other types of wire antenna elements, a combination thereof, and so forth. As such, a triangle symbol is used throughout to represent the antenna elements 208 generically as any of these types of antenna elements or another type of antenna element. In general, each feed port of the antenna element 208 is coupled to a different dedicated transceiver path 122-1 to 122-N. The dedicated transceiver paths 122-1 to 122-N can therefore be associated with different antenna elements, different polarizations, different phases, different angular directions, or combinations thereof.

FIG. 4-2 illustrates example sub-arrays of antenna elements 208 that can be coupled to different intermediate transceiver paths 124-1 to 124-M within a flexible beamforming architecture. In the depicted configuration, the antenna array 140 includes eight antenna elements 208-1, 208-2 . . . 208-8. For simplicity, the antenna elements 208-1 to 208-8 represent single-port antenna elements 402. Each of the antenna elements 208-1 to 208-8 are therefore respectively coupled to dedicated transceiver paths 122-1 to 122-N, where N equals 8.

As an example, the antenna elements 208-1 to 208-8 of the antenna array 140 are grouped into sub-arrays 428-1 and 428-2. The sub-array 428-1 includes the antenna elements 208-1 to 208-4 and the sub-array 428-2 includes the antenna elements 208-5 to 208-8. In another example, the antenna elements 208-1 to 208-8 of the antenna array 140 are grouped into sub-arrays 430-1, 430-2 . . . 430-4. In this case, the sub-array 430-1 includes the antenna elements 208-1 and 208-2, the sub-array 430-2 includes the antenna elements 208-3 and 208-4, the sub-array 430-3 includes the antenna elements 208-5 to 208-6, and the sub-array 430-4 includes the antenna elements 208-7 and 208-8.

In the hybrid beamforming configuration, the flexible beamforming network 126 couples each group of dedicated transceiver paths 122-1 to 122-N that are associated with a sub-array 428 to one of the intermediate transceiver paths 124-1 to 124-M. In some cases, a quantity of intermediate transceiver paths 124-1 to 124-M can be equal to or greater than a quantity of sub-arrays 428. An example hybrid beamforming configuration of the flexible beamforming network 126 is further described with respect to FIG. 5-2.

FIG. 5-1 illustrates an example flexible beamforming network 126 that selectively enables analog beamforming and digital beamforming. For simplicity, a quantity of dedicated transceiver paths 122-1 to 122-N is shown to equal a quantity of intermediate transceiver paths 124-1 to 124-M. In other implementations, the quantities of dedicated transceiver paths 122-1 to 122-N and intermediate transceiver paths 124-1 to 124-M can differ. In general, the quantity of intermediate transceiver paths 124-1 to 124-M is less than or equal to the quantity of dedicated transceiver paths 122-1 to 122-N. The flexible beamforming network 126 includes dedicated nodes 502-1, 502-2 . . . 502-N and intermediate nodes 504-1, 504-2 . . . 504-M. The dedicated nodes 502-1 to 502-N are respectively disposed within the dedicated transceiver paths 122-1 to 122-N. The intermediate nodes 504-1 to 504-M are respectively disposed within the intermediate transceiver paths 124-1 to 124-M.

The flexible beamforming network 126 also includes dedicated switches 506-1, 506-2 . . . 506-N, at least one shareable switch 508, and at least one coupler circuit 510. The dedicated switches 506-1 to 506-N and the shareable switch 508 can be implemented using one or more transistors, such as metal-oxide-semiconductor field-effect transistors (MOSFETs), junction field-effect transistors (JFETs), bipolar junction transistors (BJTs), and so forth. For example, the switches can comprise an n-channel metal-oxide-semiconductor field-effect transistor (NMOSFET) or a p-channel metal-oxide-semiconductor field-effect transistor (PMOSFET).

The dedicated switches 506-1 to 506-N respectively include poles 512-1, 512-2 . . . 512-N, which are respectively coupled to the dedicated nodes 502-1 to 502-N. The dedicated switches 506-1 to 506-N each include two throws 514-1 to 514-(2N). One of the throws 514-1 to 514-(2N) for each of the dedicated switches 506-1 to 506-N is coupled to the coupler circuit 510. Another one of the two throws 514-1 to 514-(2N) for each of the dedicated switches 506-1 to 506-N is respectively coupled to the intermediate nodes 504-1 to 504-M. Together, the dedicated switches 506-1 to 506-N selectively connect the dedicated nodes 502-1 to 502-N to the coupler circuit 510 or connect the dedicated nodes 502-1 to 502-N to the intermediate nodes 504-1 to 504-M.

The shareable switch 508 includes a pole 516 coupled to the intermediate node 504-1, a throw 518-1 coupled to the coupler circuit 510 and a throw 518-2 coupled to the throw 514-2 of the dedicated switch 506-1. The shareable switch 508 selectively connects the coupler circuit 510 to the intermediate node 504-1 or connects the throw 514-2 of the dedicated switch 506-1 to the intermediate node 504-1.

The coupler circuit 510 implements a N:1 coupler, and can include a transformer, a Wilkinson circuit, a directional coupler, and so forth. The coupler circuit 510 selectively operates as a combiner or a splitter according to a receive mode or a transmit mode of the wireless transceiver 120, respectively. In FIG. 5-1, the coupler circuit 510 is represented with an obelus symbol and a plus symbol. The obelus symbol represents an ability of the coupler circuit 510 to act as a splitter during transmission. As a splitter, the coupler circuit 510 splits, in an analog domain, a signal provided via the intermediate node 504-1 and respectively generates multiple split signals, which are provided to the dedicated transceiver paths 122-1 to 122-N via the dedicated switches 506-1 to 506-N. The plus symbol represents an ability of the coupler circuit 510 to act as a combiner during reception. As a combiner, the coupler circuit 510 combines, in the analog domain, signals that are provided via the dedicated switches 506-1 to 506-N to generate a combined signal.

The flexible beamforming network 126 of FIG. 5-1 can selectively be in an analog beamforming configuration 520 or a digital beamforming configuration 522. In the analog beamforming configuration 520, the dedicated switches 506-1 to 506-N connect the dedicated nodes 502-1 to 502-N to the coupler circuit 510. Additionally, the shareable switch 508 connects the intermediate node 504-1 to the coupler circuit 510. As such, the dedicated transceiver paths 122-1 to 122-N are each coupled to the intermediate transceiver path 124-1. In this manner, the intermediate transceiver path 124-1 is shared by the dedicated transceiver paths 122-1 to 122-N. This enables analog beamforming to be performed during transmission or reception. Because the flexible beamforming network 126 does not connect or couple the intermediate transceiver paths 124-2 to 124-M to the dedicated transceiver paths 122-2 to 122-N, components within or connected to the intermediate transceiver paths 124-2 to 124-M can be in the disabled state to conserve power.

In the digital beamforming configuration 522, the dedicated switches 506-1 to 506-N and the shareable switch 508 together connect two or more of the dedicated nodes 502-1 to 502-N to the intermediate nodes 504-1 to 504-M, respectively. For example, the dedicated switch 506-1 and the shareable switch 508 connect the dedicated node 502-1 to the intermediate node 504-1 and the dedicated switch 506-2 connects the dedicated node 502-2 to the intermediate node 504-2. As another example, the dedicated switches 506-2 and 506-N respectively connect the dedicated nodes 502-2 and 502-N to the intermediate nodes 504-2 and 504-M. In the digital beamforming configuration 522, the intermediate transceiver paths 124-1 to 124-M are not shared amongst the dedicated transceiver paths 122-1 to 122-N. This enables digital beamforming to be performed during transmission or reception. Because the flexible beamforming network 126 connects the intermediate transceiver paths 124-1 to 124-M to the dedicated transceiver paths 122-1 to 122-N, the intermediate transceiver paths 124-1 to 124-M are in the enabled state and consume power. An example hybrid beamforming configuration of the flexible beamforming network 126 is further described with respect to FIG. 5-2.

FIG. 5-2 illustrates another example flexible beamforming network 126 that selectively enables analog beamforming and hybrid beamforming. For simplicity, a quantity of intermediate transceiver paths 124-1 to 124-M is shown to equal a quantity of sub-arrays 428-1 to 428-M. In other implementations, the quantities of intermediate transceiver paths 124-1 to 124-M and sub-arrays 428-1 to 428-M can differ. Each of the sub-arrays 428-1 to 428-M include two or more of the antenna elements 208-1 to 208-N. In some implementations, the sub-arrays 428-1 to 428-M represent the sub-arrays 428-1 to 428-2 of FIG. 4-2 or the sub-arrays 430-1 to 430-4 of FIG. 4-2.

The flexible beamforming network 126 in FIG. 5-2 is similar to the flexible beamforming network 126 of FIG. 5-1, except a quantity of dedicated transceiver paths 122-1 to 122-N is greater than a quantity of intermediate transceiver paths 124-1 to 124-M. As such, the flexible beamforming network 126 includes additional coupler circuits 526-1 to 526-M and a quantity of dedicated switches is equal to M instead of N. The coupler circuits 526-1 to 526-M are respectively coupled between poles 512-1 to 512-N of the dedicated switches 506-1 to 506-M and the dedicated transceiver paths 122-1 to 122-N associated with different sub-arrays 428-1 to 428-M. For example, the coupler circuit 526-1 is coupled to the dedicated transceiver paths 122-1 to 122-(N/M), which are associated with the sub-array 428-1. The sub-array 428-1 can include N/M single-port antenna elements 402 respectively coupled to the dedicated transceiver paths 122-1 to 122-(N/M). Alternatively, the sub-array 428-1 can include N/M dual-port antenna elements 404 and the dedicated transceiver paths 122-1 to 122-(N/M) are respectively coupled to one of the feed ports 406-2 or 406-3 of the dual-port antenna elements 404.

The flexible beamforming network 126 of FIG. 5-2 can selectively be in the analog beamforming configuration 520 or a hybrid beamforming configuration 524. In the analog beamforming configuration 520, the dedicated switches 506-1 to 506-M connect the coupler circuits 526-1 to 526-M to the coupler circuit 510. Additionally, the shareable switch 508 connects the intermediate node 504-1 to the coupler circuit 526-1. As such, the dedicated transceiver paths 122-1 to 122-N are each coupled to the intermediate transceiver path 124-1. In this manner, the intermediate transceiver path 124-1 is shared by the dedicated transceiver paths 122-1 to 122-N. This enables analog beamforming to be performed during transmission or reception. Because the flexible beamforming network 126 does not connect or couple the intermediate transceiver paths 124-2 to 124-M to the dedicated transceiver paths 122-1 to 122-N, the intermediate transceiver paths 124-2 to 124-M can be in the disabled state to conserve power.

In the hybrid beamforming configuration 524, the dedicated switches 506-1 to 506-M respectively connect the coupler circuits 526-1 to 526-M to the intermediate nodes 504-1 to 504-M. As such, the intermediate transceiver paths 124-1 to 124-M are coupled to different groups of dedicated transceiver paths 122-1 to 122-N that correspond to the sub-arrays 428-1 to 428-M. In other words, the intermediate transceiver path 124-1 is shared by the dedicated transceiver paths 122-1 to 122-(N/M), the intermediate transceiver path 124-2 is shared by the dedicated transceiver paths 122-(N/M+1) to 122-(2N/M), and the intermediate transceiver path 124-M is shared by the dedicated transceiver paths 122-((M−1)N/M+1) to 122-N. Another implementation of the flexible beamforming network 126 that can selectively be in the analog beamforming configuration 520, the digital beamforming configuration 522, or the hybrid beamforming configuration 524 is further described with respect to FIG. 6-1.

Figures 1, 6:
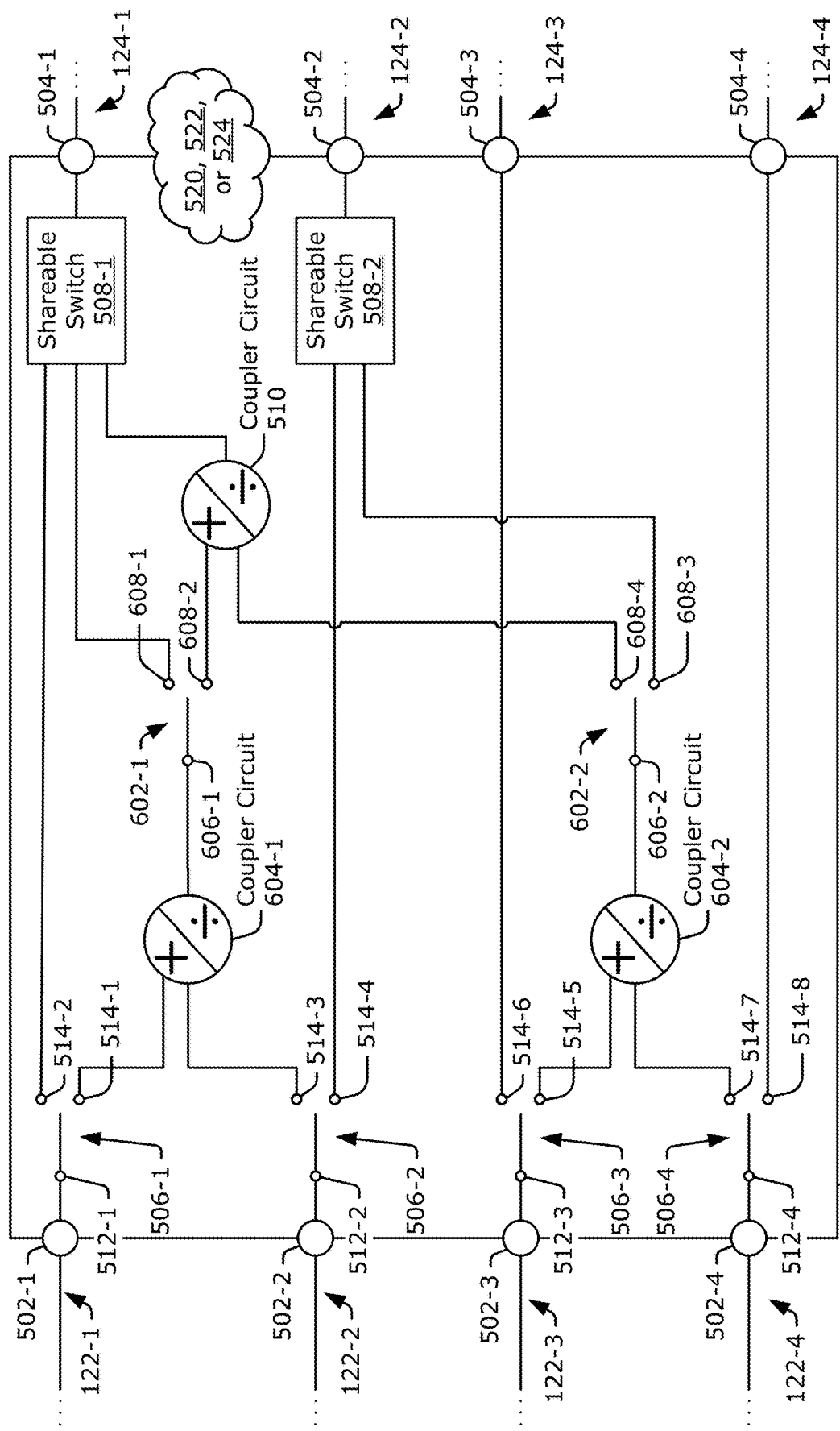
Figures 2, 6:
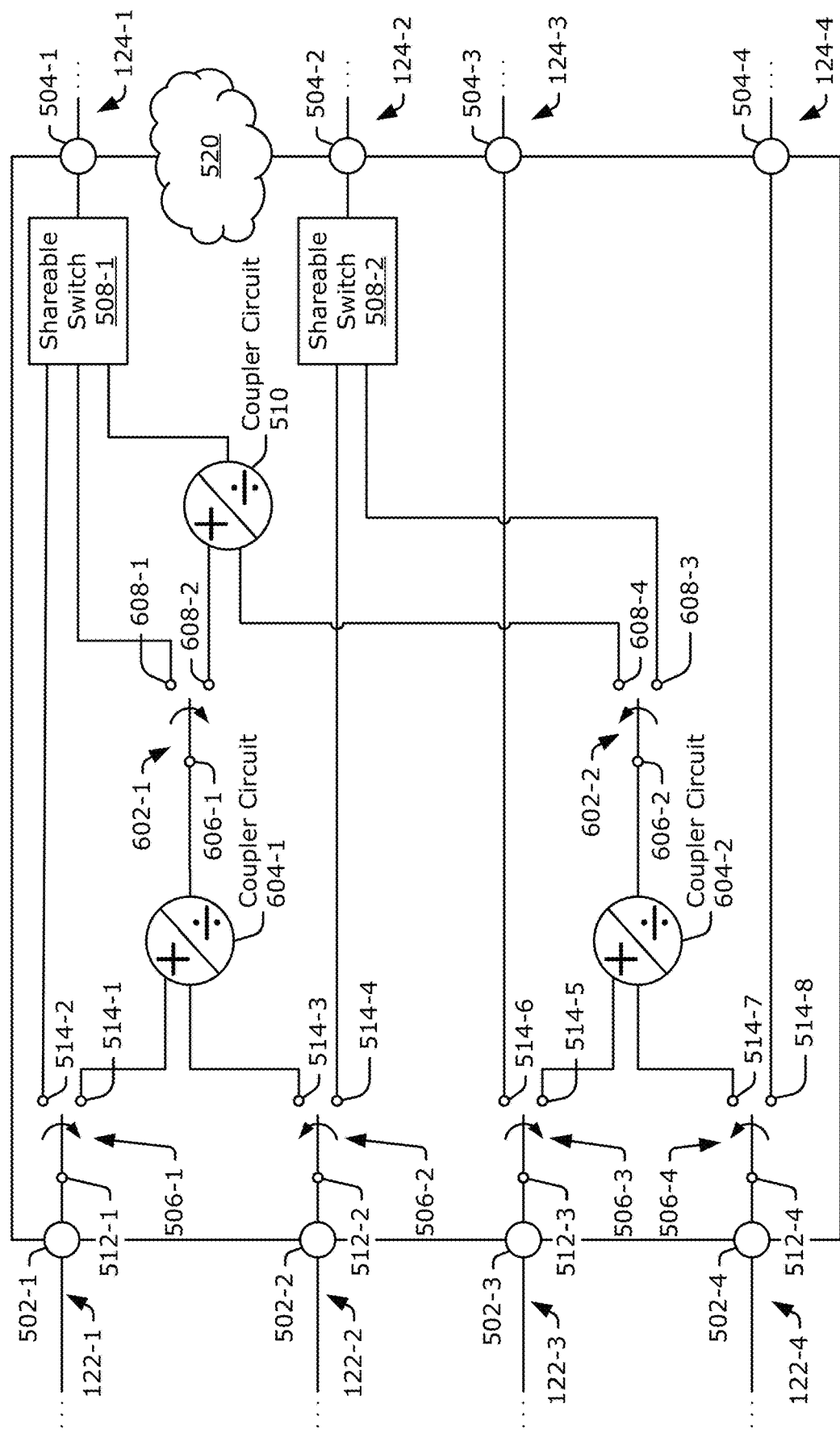
Figures 3, 6:
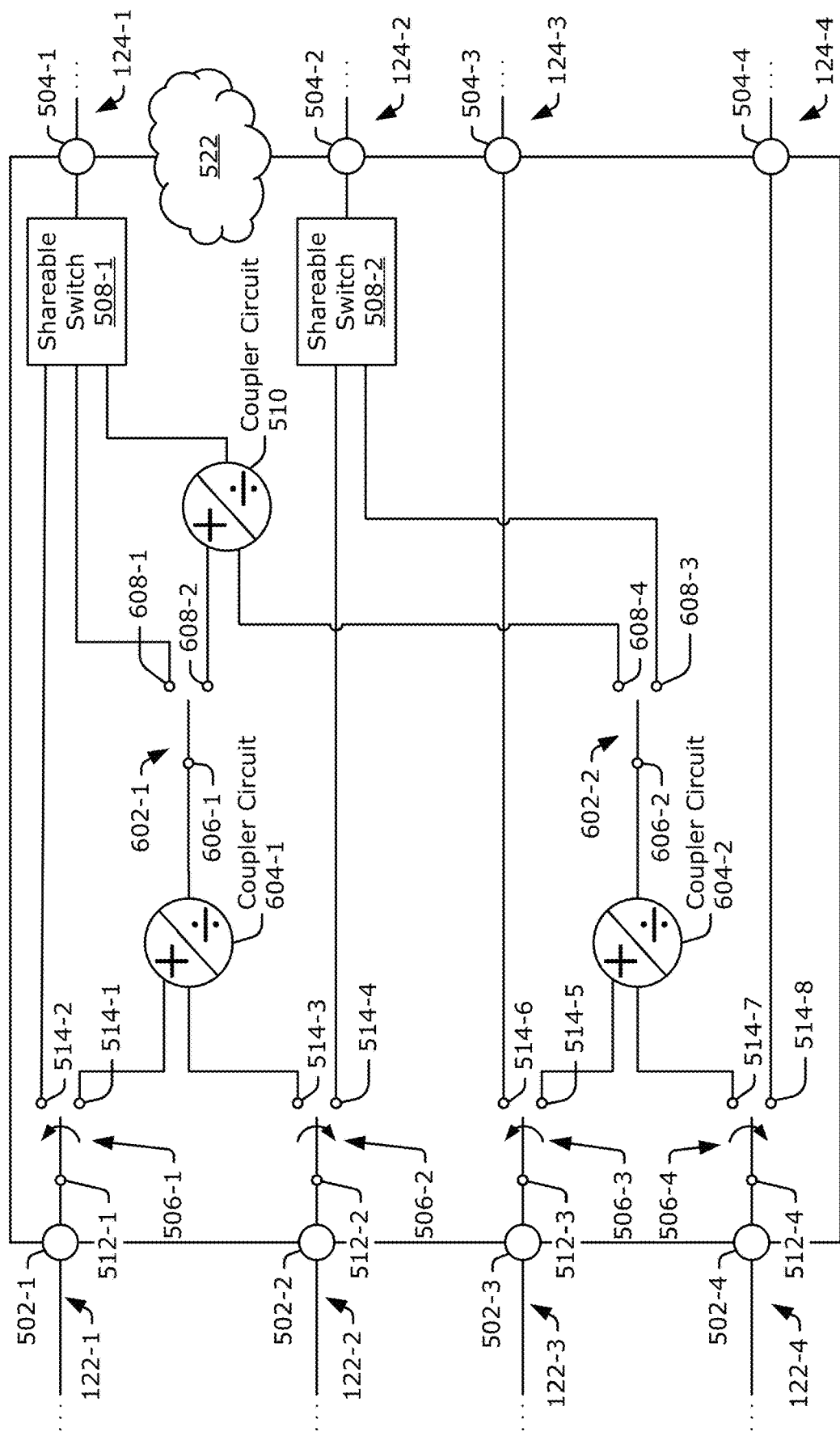
Figures 4, 6:
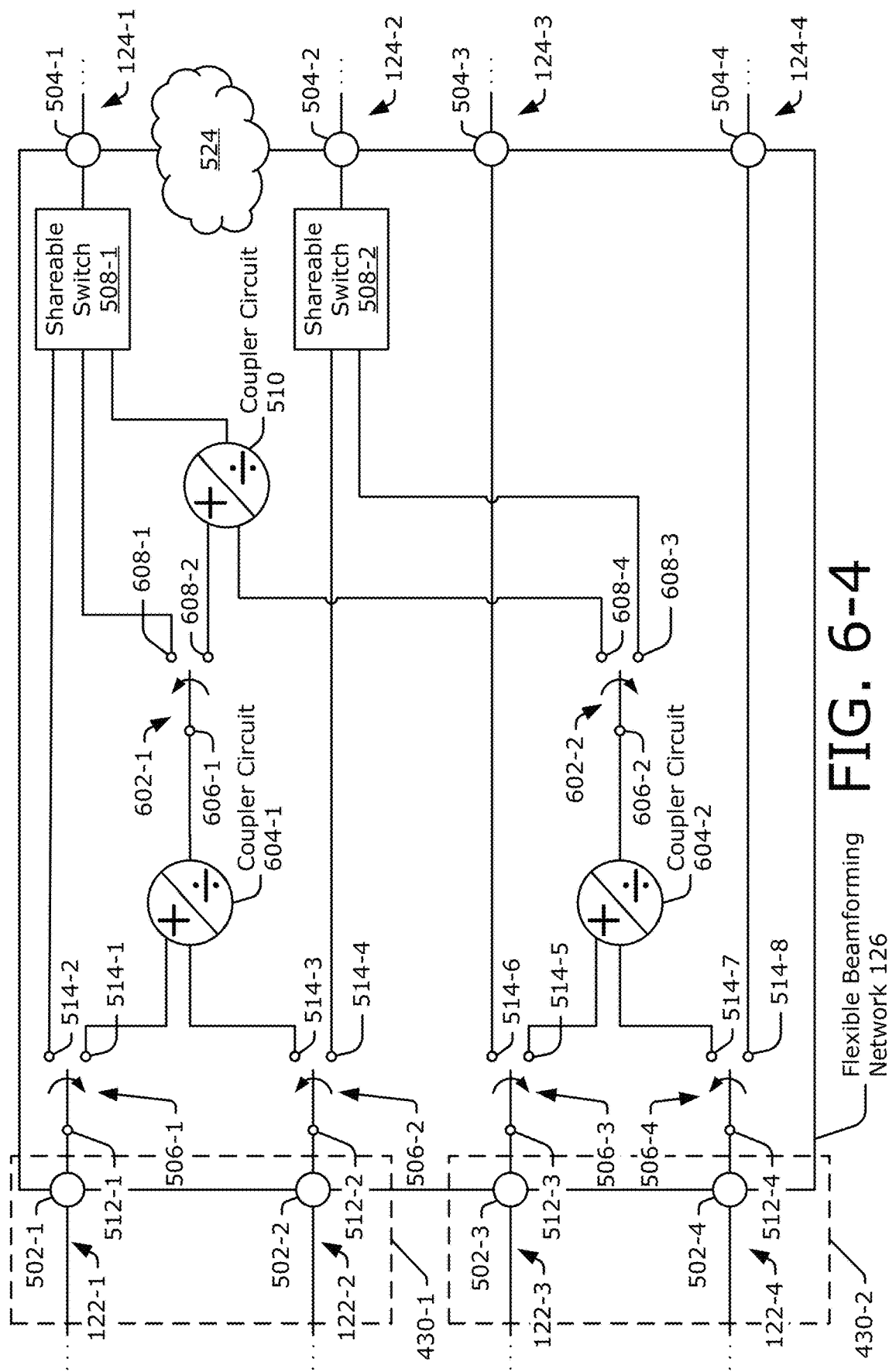

FIG. 6-1 illustrates an example flexible beamforming network 126 that selectively enables analog beamforming, digital beamforming, and hybrid beamforming. The flexible beamforming network 126 of FIG. 6-1 is similar to the flexible beamforming network of FIG. 5-1, with the exception of N and M being equal to four, and the addition of intermediate switches 602-1 and 602-2 and coupler circuits 604-1 and 604-2. The flexible beamforming network 126 of FIG. 6-1 can couple the dedicated transceiver paths 122-1 to 122-4 together across multiple stages, which enables the flexible beamforming network 126 to also support hybrid beamforming.

The intermediate switches 602-1 and 602-2 and the coupler circuits 604-1 and 604-2 are coupled between dedicated switches 506-1 to 506-4 and the coupler circuit 510. In particular, the coupler circuit 604-1 is coupled to the throw 514-1 of the dedicated switch 506-1 and the throw 514-3 of the dedicated switch 506-2. Likewise, the coupler circuit 604-2 is coupled to the throw 514-5 of the dedicated switch 506-3 and the throw 514-7 of the dedicated switch 506-4. The intermediate switch 602-1 includes a pole 606-1 coupled to the coupler circuit 604-1, a throw 608-1 coupled to the intermediate node 504-1, and a throw 608-2 coupled to the coupler circuit 510. The intermediate switch 602-2 includes a pole 606-2 coupled to the coupler circuit 604-2, a throw 608-3 coupled to the intermediate node 504-2, and a throw 608-4 coupled to the coupler circuit 510. The flexible beamforming network 126 of FIG. 6-1 can selectively be in the analog beamforming configuration 520, the digital beamforming configuration 522, or the hybrid beamforming configuration 524, as further described with respect to FIGS. 6-2 to 6-4, respectively.

FIG. 6-2 illustrates an example analog beamforming configuration 520 of the flexible beamforming network 126 of FIG. 6-1. In the analog beamforming configuration 520, the dedicated switches 506-1 and 506-2 respectively connect the dedicated nodes 502-1 and 502-2 to the coupler circuit 604-1. Likewise, the dedicated switches 506-3 and 506-4 respectively connect the dedicated nodes 502-3 and 502-4 to the coupler circuit 604-2.

The intermediate switches 602-1 and 602-2 respectively connect the coupler circuits 604-1 and 604-2 to the coupler circuit 510. The shareable switch 508-1 connects the coupler circuit 510 to the intermediate node 504-1. In this way, the flexible beamforming network 126 connects the dedicated transceiver paths 122-1 to 122-4 to the intermediate transceiver path 124-1 to enable analog beamforming. The intermediate transceiver paths 124-2 to 124-4 can be in the disabled state to conserve power.

FIG. 6-3 illustrates an example digital beamforming configuration 522 of the flexible beamforming network 126 of FIG. 6-1. In the digital beamforming configuration 522, the dedicated switches 506-1 to 506-4 and the shareable switches 508-1 and 508-2 together connect the dedicated nodes 502-1 to 502-4 to the intermediate nodes 504-1 to 504-4, respectively. As such, the flexible beamforming network 126 respectively connects the dedicated transceiver paths 122-1 to 122-4 to the intermediate transceiver paths 124-1 to 124-4. In this configuration, the coupler circuits 510, 604-1, and 604-2 associated with the analog beamformer 134 are bypassed.

FIG. 6-4 illustrates an example hybrid beamforming configuration 524 of the flexible beamforming network 126 of FIG. 6-1. In this example, the dedicated transceiver paths 122-1 to 122-2 are associated with a first sub-array 430-1 and the dedicated transceiver paths 122-3 and 122-4 are associated with a second sub-array 430-2. Similar to the analog beamforming configuration 520 shown in FIG. 6-2, the dedicated switches 506-1 and 506-2 respectively connect the dedicated nodes 502-1 and 502-2 to the coupler circuit 604-1 in the hybrid beamforming configuration 524. Likewise, the dedicated switches 506-3 and 506-4 respectively connect the dedicated nodes 502-3 and 502-4 to the coupler circuit 604-2.

In contrast to the analog beamforming configuration 520 of FIG. 6-2, the intermediate switches 602-1 and 602-2 and the shareable switches 508-1 and 508-2 together connect the coupler circuits 604-1 and 604-2 to the intermediate nodes 504-1 and 504-2, respectively, in the hybrid beamforming configuration 524. In this way, the flexible beamforming network 126 couples the dedicated transceiver paths 122-1 to 122-2 to the intermediate transceiver path 124-1 and couples the dedicated transceiver paths 122-3 and 122-4 to the intermediate transceiver path 124-2 to enable hybrid beamforming Components within or connected to the intermediate transceiver paths 124-3 and 124-4 can be in the disabled state to conserve power.

Although not explicitly shown, the flexible beamforming network 126 can also support polarization diversity. Consider, for example, that the dedicated transceiver paths 122-1 and 122-2 of FIG. 6-4 are associated with a first polarization and the dedicated transceiver paths 122-3 and 122-4 are associated with a second polarization. The dedicated transceiver paths 122-1 and 122-2 can be coupled to horizontally-polarized feed ports 412 of different horizontally-polarized patch antenna elements 408 and the dedicated transceiver paths 122-3 and 122-4 can be coupled to vertically-polarized feed ports 414 of different vertically-polarized patch antenna elements 410, for instance. Alternatively, the dedicated transceiver paths 122-1 and 122-2 can be coupled to horizontally-polarized feed ports 412 of different dual-polarized antenna elements (e.g., dual-polarized patch antenna elements 416 or dual-polarized cross-patch antenna elements 418) and the dedicated transceiver paths 122-3 and 122-4 can be coupled to vertically-polarized feed ports 414 of these dual-polarized antenna elements.

To support polarization diversity, the hybrid beamforming configuration 524 can be used to couple groups of dedicated transceiver paths 122-1 to 122-N associated with different polarizations to different intermediate transceiver paths 124-1 to 124-M. In this example, the flexible beamforming network 126 couples the dedicated transceiver paths 122-1 and 122-2 that are associated with a first polarization to the intermediate transceiver path 124-1 and couples the dedicated transceiver paths 122-3 and 122-4 that are associated with a second polarization to the intermediate transceiver path 124-2. This can enable the analog beamformer 134 to perform analog beamforming for both polarizations.

FIG. 7 illustrates another example flexible beamforming network 126 that selectively enables analog beamforming, digital beamforming, and hybrid beamforming. The flexible beamforming network 126 of FIG. 7 is similar to the flexible beamforming network 126 of FIG. 6-4 but expanded to support eight dedicated transceiver paths 122-1 to 122-8 with the four intermediate transceiver paths 124-1 to 124-4. In this case, a quantity of dedicated transceiver paths 122 is greater than a quantity of intermediate transceiver paths 124 (e.g., N>M).

Additionally, the dedicated transceiver paths 122-1 to 122-4 are associated with a first polarization 702-1 and the dedicated transceiver paths 122-5 to 122-8 are associated with a second polarization 702-2. In one implementation, the dedicated transceiver paths 122-1 to 122-4 are coupled to four antenna elements 208-1 to 208-4 (not shown) implemented as horizontally-polarized patch antenna elements 408 of FIG. 4 and the dedicated transceiver paths 122-5 to 122-8 are coupled to four other antenna elements 208-5 to 208-8 (not shown), which are implemented as vertically-polarized patch antenna elements 410. In another implementation, the dedicated transceiver paths 122-1 to 122-4 are respectively coupled to horizontally-polarized feed ports 412 of four antenna elements 208-1 to 208-4, which are implemented as dual-polarized patch antenna elements 416. Likewise, the dedicated transceiver paths 122-5 to 122-8 are respectively coupled to vertically-polarized feed ports 515 of the four antenna elements 208-1 to 208-4.

Similar to the flexible beamforming network 126 of FIG. 6-4, the flexible beamforming network 126 of FIG. 7 can selectively be in the analog beamforming configuration 520, the digital beamforming configuration 522, or the hybrid beamforming configuration 524. In the analog beamforming configuration 520, the flexible beamforming network 126 can couple the dedicated transceiver paths 122-1 to 122-4 to the intermediate transceiver path 124-1 and/or couple the dedicated transceiver paths 122-5 to 122-8 to the intermediate transceiver path 124-2. In the digital beamforming configuration 522, the flexible beamforming network 126 can selectively couple the dedicated transceiver paths 122-1 to 122-4 to the intermediate transceiver paths 124-1 to 124-4, respectively, or couple the dedicated transceiver paths 122-5 to 122-8 to the intermediate transceiver paths 124-1 to 124-4, respectively. In the hybrid beamforming configuration 524, the flexible beamforming network 126 can couple the dedicated transceiver paths 122-1 and 122-2 to the intermediate transceiver path 124-1, the dedicated transceiver paths 122-3 and 122-4 to the intermediate transceiver path 124-2, the dedicated transceiver paths 122-5 and 122-6 to the intermediate transceiver path 124-3, and the dedicated transceiver paths 122-7 and 122-8 to the intermediate transceiver path 124-4.

In some implementations, the flexible beamforming network 126 can be implemented without the one or more shareable switches 508 shown in FIGS. 5-1 to 7 if isolation performance of the dedicated switches 506 and the coupler circuits 510 are sufficient. As such, the shareable switches 508 can be optional in some cases.

In another implementation not explicitly shown, the coupler circuit(s) 510 and the intermediate switches 602 of FIGS. 6-1 and 7 can be removed to implement a flexible beamforming network 126 that can selectively be in the digital beamforming configuration 522 or the hybrid beamforming configuration 524. In this case, the coupler circuit 604-1 is connected to the shareable switch 508-1 and the coupler circuit 604-2 is connected to the shareable switch 508-2. In the digital beamforming configuration 522, the flexible beamforming network 126 respectively connects the dedicated transceiver paths 122-1 to 122-4 to the intermediate transceiver paths 124-1 to 124-4 via the dedicated switches 506-1 to 506-4. In contrast, the flexible beamforming network 126 couples the dedicated transceiver paths 122-1 and 122-2 to the intermediate transceiver path 124-1 and couples the dedicated transceiver paths 122-3 and 122-4 to the intermediate transceiver path 124-2 in the hybrid beamforming configuration 524.

Figure 8:
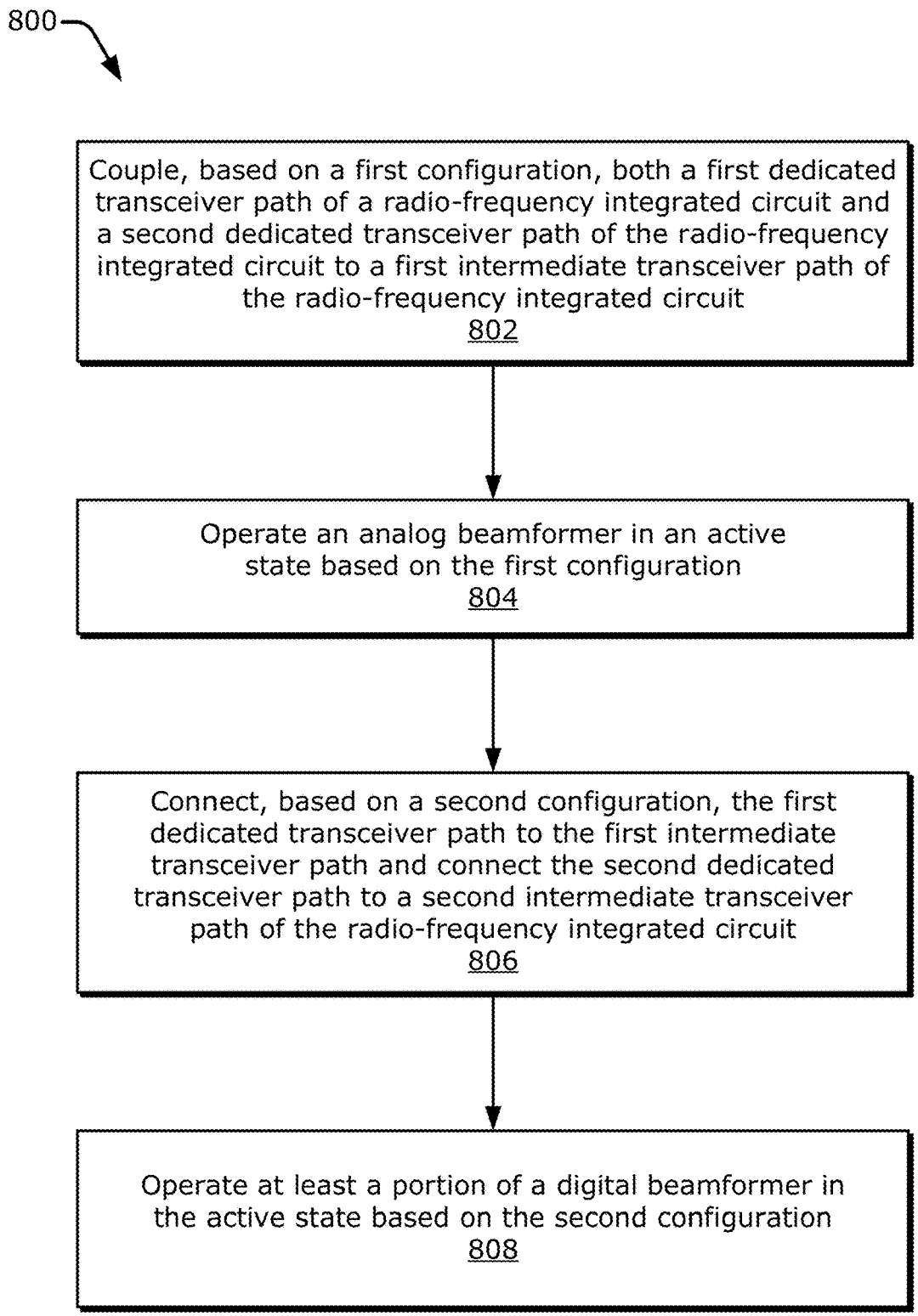
FIG. 8 is a flow diagram illustrating an example process for flexible beamforming.

FIG. 8 is a flow diagram illustrating an example process 800 for operating a flexible beamforming architecture. The process 800 is described in the form of a set of blocks 802-808 that specify operations that can be performed. However, operations are not necessarily limited to the order shown in FIG. 8 or described herein, for the operations may be implemented in alternative orders or in fully or partially overlapping manners. Operations represented by the illustrated blocks of the process 800 may be performed by a wireless transceiver (e.g., of FIG. 1) or a flexible beamformer (e.g., of FIG. 1). More specifically, the operations of the process 800 may be performed, at least partially, by a flexible beamforming network 126 as shown in FIGS. 1, 2-2, and 5-1 to 7.

At block 802, both a first dedicated transceiver path of a radio-frequency integrated circuit and a second dedicated transceiver path of the radio-frequency integrated circuit are coupled to a first intermediate transceiver path of the radio-frequency integrated circuit based on a first configuration. For example, the flexible beamforming network 126 of FIGS. 5-1, 5-2, 6-1, and 7 couples both the dedicated transceiver paths 122-1 and at least another one of the dedicated transceiver paths 122-2 to 122-N of the radio-frequency integrated circuit 202 to the intermediate transceiver path 124-1 based on the analog beamforming configuration 520. The flexible beamforming network 126 includes dedicated switches 506 and one or more coupler circuits 510 to couple the dedicated transceiver paths 122-1 and the other dedicated transceiver path 122-2 to 122-N to the intermediate transceiver path 124-1.

At block 804, an analog beamformer operates in an active state based on the first configuration. For example, the analog beamformer 134 operates in an active state to perform analog beamforming using the dedicated transceiver path 122-1, the other dedicated transceiver path 122-2 to 122-N, and the flexible beamforming network 126.

At block 806, the first dedicated transceiver path is connected to the first intermediate transceiver path and the second dedicated transceiver path is connected to a second intermediate transceiver path of the radio-frequency integrated circuit based on a second configuration. For example, the flexible beamforming network 126 of FIGS. 5-1, 5-2, 6-1, and 7 connects (or couples) the dedicated transceiver path 122-1 to the intermediate transceiver path 124-1 and connects (or couples) the other dedicated transceiver path 122-2 to 122-N to another one of the intermediate transceiver paths 124-2 to 124-M.

At block 808, at least a portion of a digital beamformer operates in the active state based on the second configuration. For example, the digital beamformer 136 operates in the active state to perform hybrid beamforming using a portion of the digital weighting circuits 222-1 to 222-M and the digital coupler circuit 224 or to perform digital beamforming using the digital weighting circuits 222-1 to 222-M and the digital coupler circuit 224.

In FIGS. 5-1 and 6-3, the first dedicated transceiver path and the second dedicated transceiver path can correspond to the dedicated transceiver paths 122-1 and 122-2. Likewise, the first intermediate transceiver path and the second intermediate transceiver path can correspond to the intermediate transceiver paths 124-1 and 124-2.

In FIG. 5-2, the first dedicated transceiver path can correspond to one of the dedicated transceiver paths 122-1 to 122-(N/M) and the second dedicated transceiver path can correspond to one of the dedicated transceiver paths 122-(N/M+1) to 122-(2N−M). In FIG. 6-4, the first dedicated transceiver path can correspond to one of the dedicated transceiver paths 122-1 and 122-2 and the second dedicated transceiver path can correspond to one of the dedicated transceiver paths 122-3 to 122-4. In both FIGS. 5-2 and 6-4, the first intermediate transceiver path and the second intermediate transceiver path can correspond to the intermediate transceiver paths 124-1 and 124-2.

In FIG. 7, the first dedicated transceiver path can correspond to the dedicated transceiver path 122-1 and the second dedicated transceiver path can correspond to the dedicated transceiver path 122-2 or the dedicated transceiver path 122-3. The first intermediate transceiver path can correspond to the intermediate transceiver path 124-1 and the second intermediate transceiver path can correspond to the intermediate transceiver path 124-2 or the intermediate transceiver path 124-3.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
    a wireless transceiver comprising:
        at least four dedicated transceiver paths configured to be respectively coupled to at least four antenna feed ports;
        at least four intermediate transceiver paths; and
        a flexible beamforming network coupled between the at least four dedicated transceiver paths and the at least four intermediate transceiver paths, the flexible beamforming network configured to selectively:
            be in a first configuration that couples the at least four dedicated transceiver paths to one of the at least four intermediate transceiver paths; and
            be in a second configuration that connects each one of the at least four dedicated transceiver paths to a respective intermediate transceiver path of the at least four intermediate transceiver paths; and
            be in a third configuration that connects a first set of the at least four dedicated transceiver paths to a first intermediate transceiver path of the at least four intermediate transceiver paths and connects a second set of the at least four dedicated transceiver paths to a second intermediate transceiver path of the at least four intermediate transceiver paths.

2. The apparatus of claim 1, wherein:
    the at least four dedicated transceiver paths comprise a first dedicated transceiver path and a second dedicated transceiver path;
    the at least four intermediate transceiver paths comprise a first intermediate transceiver path and a second intermediate transceiver path; and
    the flexible beamforming network comprises:
        a first coupler circuit coupled to the first intermediate transceiver path;
        a first dedicated switch comprising:
            a first pole coupled to the first dedicated transceiver path;
            a first throw coupled to the first coupler circuit; and
            a second throw coupled to the first intermediate transceiver path; and
        a second dedicated switch comprising:
            a second pole coupled to the second dedicated transceiver path;
            a third throw coupled to the first coupler circuit; and
            a fourth throw coupled to the second intermediate transceiver path.

3. The apparatus of claim 2, wherein:
    the first dedicated switch is configured to selectively:
        connect the first dedicated transceiver path to the first coupler circuit based on the first configuration; and
        connect the first dedicated transceiver path to the first intermediate transceiver path based on the second configuration; and
    the second dedicated switch is configured to selectively:
        connect the second dedicated transceiver path to the first coupler circuit based on the first configuration; and
        connect the second dedicated transceiver path to the second intermediate transceiver path based on the second configuration.

4. The apparatus of claim 2, wherein the flexible beamforming network comprises a shareable switch, the shareable switch comprising:
    a third pole coupled to the first intermediate transceiver path;
    a fifth throw coupled to the first coupler circuit; and
    a sixth throw coupled to the second throw of the first dedicated switch.

5. The apparatus of claim 4, wherein the shareable switch is configured to selectively:
    connect the first coupler circuit to the first intermediate transceiver path based on the first configuration; and
    connect the first dedicated transceiver path to the first intermediate transceiver path based on the second configuration.

6. The apparatus of claim 2, wherein the first coupler circuit is configured to selectively:
    operate as a splitter based on a transmit mode and based on the first configuration; and
    operate as a combiner based on a receive mode and based on the first configuration.

7. The apparatus of claim 2, wherein:
    the flexible beamforming network is in the first configuration; and
    the wireless transceiver comprises an analog beamformer, the analog beamformer comprising:
        the first coupler circuit;
        a first phase shifter disposed in the first dedicated transceiver path; and
        a second phase shifter disposed in the second dedicated transceiver path.

8. The apparatus of claim 2, wherein:
    the flexible beamforming network is in the second configuration; and the wireless transceiver comprises a digital beamformer, the digital beamformer comprising:
a first digital weighting circuit coupled to the first intermediate transceiver path;
a second digital weighting circuit coupled to the second intermediate transceiver path; and
a digital coupler circuit coupled to the first weighting circuit and the second weighting circuit.

9. The apparatus of claim 2, wherein:
the at least four dedicated transceiver paths comprise a third dedicated transceiver path and a fourth dedicated transceiver path; and
the flexible beamforming network comprises:
a second coupler circuit coupled to the first pole of the first dedicated switch, the first dedicated transceiver path, and the third dedicated transceiver path; and
a third coupler circuit coupled to the second pole of the second dedicated switch, the second dedicated transceiver path, and the fourth dedicated transceiver path.

10. The apparatus of claim 9, wherein:
the flexible beamforming network is in the third configuration; and
the wireless transceiver comprises a hybrid beamformer, the hybrid beamformer comprising:
the second coupler circuit;
the third coupler circuit;
a first phase shifter disposed in the first dedicated transceiver path;
a second phase shifter disposed in the second dedicated transceiver path;
a third phase shifter disposed in the third dedicated transceiver path;
a fourth phase shifter disposed in the fourth dedicated transceiver path;
a first digital weighting circuit coupled to the first intermediate transceiver path;
a second digital weighting circuit coupled to the second intermediate transceiver path; and
a digital coupler circuit coupled to the first weighting circuit and the second weighting circuit.

11. The apparatus of claim 2, wherein:
the at least four dedicated transceiver paths comprise a third dedicated transceiver path and a fourth dedicated transceiver path;
the at least four intermediate transceiver paths comprise a third intermediate transceiver path and a fourth intermediate transceiver path; and
the flexible beamforming network comprises:
a second coupler circuit coupled to the first throw of the first dedicated switch and the third throw of the second dedicated switch;
a third coupler circuit;
a third dedicated switch comprising:
a third pole coupled to the third dedicated transceiver path;
a fifth throw coupled to the third coupler circuit; and
a sixth throw coupled to the third intermediate transceiver path;
a fourth dedicated switch comprising:
a fourth pole coupled to the fourth dedicated transceiver path;
a seventh throw coupled to the third coupler circuit; and
an eighth throw coupled to the fourth intermediate transceiver path;
a first intermediate switch comprising:
a fifth pole coupled to the second coupler circuit;
a ninth throw coupled to the first intermediate transceiver path; and
a tenth throw coupled to the first coupler circuit; and
a second intermediate switch comprising:
a sixth pole coupled to the third coupler circuit;
an eleventh throw coupled to the second intermediate transceiver path; and
a twelfth throw coupled to the first coupler circuit.

12. The apparatus of claim 11, wherein the flexible beamforming network comprises:
a first shareable switch comprising:
a seventh pole coupled to the first intermediate transceiver path;
a thirteenth throw coupled to the second throw of the first dedicated switch;
a fourteenth throw coupled to the ninth throw of the first intermediate switch; and
a fifteenth throw coupled to the first coupler circuit; and
a second shareable switch comprising:
an eight pole coupled to the second intermediate transceiver path;
a sixteenth throw coupled to the fourth throw of the second dedicated switch; and
a seventeenth throw coupled to the eleventh throw of the second intermediate switch.

13. The apparatus of claim 11, wherein: the at least four dedicated transceiver paths are configured to be coupled to respective antenna elements of a sub-array of an antenna array.

14. The apparatus of claim 11, wherein:
the first set of the at least four dedicated transceiver paths is coupled to a first sub-array of antenna elements of an antenna array; and
the second set of the at least four dedicated transceiver paths is coupled to a second sub-array of antenna elements of an antenna array.

15. The apparatus of claim 2, wherein:
the at least four dedicated transceiver paths comprise a third dedicated transceiver path and a fourth dedicated transceiver path;
the at least four intermediate transceiver paths comprise a third intermediate transceiver path and a fourth intermediate transceiver path; and
the flexible beamforming network comprises:
a second coupler circuit coupled to the first throw of the first dedicated switch and the third throw of the second dedicated switch;
a third coupler circuit coupled to the third intermediate transceiver path;
a third dedicated switch comprising:
a third pole coupled to the third dedicated transceiver path;
a fifth throw coupled to the third coupler circuit; and
a sixth throw coupled to the first intermediate transceiver path;
a fourth dedicated switch comprising:
a fourth pole coupled to the fourth dedicated transceiver path;
a seventh throw coupled to the third coupler circuit; and
an eighth throw coupled to the second intermediate transceiver path; and
a first intermediate switch comprising:
a fifth pole coupled to the second coupler circuit;
a ninth throw coupled to the first intermediate transceiver path; and
a tenth throw coupled to the first coupler circuit.

16. The apparatus of claim 15, wherein:
the first and second dedicated transceiver paths are configured to be coupled to respective feed ports of an antenna array associated with a first polarization; and
the third and fourth dedicated transceiver paths are configured to be coupled to respective feed ports of the antenna array associated with a second polarization.

17. The apparatus of claim 15, wherein:
the first and third dedicated transceiver paths are configured to be coupled to a first dual-port antenna element of an antenna array; and
the second and fourth dedicated transceiver paths are configured to be coupled to a second dual-port antenna element of the antenna array.

18. The apparatus of claim 1, wherein:
the first set of the at least four dedicated transceiver paths comprises at least two dedicated transceiver paths of the at least four dedicated transceiver paths; and
the second set of the at least four dedicated transceiver paths comprises at least two other dedicated transceiver paths of the at least four dedicated transceiver paths.

19. An apparatus comprising:
a wireless transceiver comprising:
at least four dedicated transceiver paths configured to be respectively coupled to at least four antenna elements;
at least four intermediate transceiver paths; and
beamforming flexibility means for selectively:
coupling the at least four dedicated transceiver paths to one of the at least four intermediate transceiver paths based on a first configuration,
connecting each one of the at least four dedicated transceiver paths to a respective intermediate transceiver path of the at least four intermediate transceiver paths based on a second configuration, and
coupling a first set of the at least four dedicated transceiver paths to a first intermediate transceiver path of the at least four intermediate transceiver paths and coupling a second set of the at least four dedicated transceiver paths to a second intermediate transceiver path of the at least four intermediate transceiver paths based on a third configuration, the beamforming flexibility means coupled between the set of dedicated transceiver paths and the set of intermediate transceiver paths.

20. The apparatus of claim 19, wherein the beamforming flexibility means comprises:
coupling means for interfacing both a first dedicated transceiver path of the at least four dedicated transceiver paths and a second dedicated transceiver path of the at least four dedicated transceiver paths with the one of the at least four intermediate transceiver paths;
first switching means for selectively connecting the first dedicated transceiver path to the coupling means based on the first configuration or connecting the first dedicated transceiver path to the one of the at least four intermediate transceiver paths based on the second configuration; and
second switching means for selectively connecting the second dedicated transceiver path to the coupling means based on the first configuration or connecting the second dedicated transceiver path to a second intermediate transceiver path of the at least four intermediate transceiver paths based on the second configuration.

21. The apparatus of claim 19, wherein:
the at least four dedicated transceiver paths comprise:
a first dedicated transceiver path;
a second dedicated transceiver path;
a third dedicated transceiver path; and
a fourth dedicated transceiver path;
the at least four intermediate transceiver paths comprise:
a first intermediate transceiver path;
a second intermediate transceiver path;
a third intermediate transceiver path; and
a fourth intermediate transceiver path; and
the beamforming flexibility means is configured to selectively:
couple the first dedicated transceiver path, the second dedicated transceiver path, the third dedicated transceiver path, and the fourth dedicated transceiver path to the first intermediate transceiver path based on the first configuration;
connect the first dedicated transceiver path to the first intermediate path based on the second configuration;
connect the second dedicated transceiver path to the second intermediate path based on the second configuration;
connect the third dedicated transceiver path to the third intermediate transceiver path based on the second configuration;
connect the fourth dedicated transceiver path to the fourth intermediate transceiver path based on the second configuration;
couple both the first dedicated transceiver path and the second dedicated transceiver path to the first intermediate transceiver path based on the third configuration; and
couple both the third dedicated transceiver path and the fourth dedicated transceiver path to the second intermediate transceiver path based on the third configuration.

22. The apparatus of claim 19, further comprising:
analog means for performing analog beamforming based on the first configuration;
digital means for performing digital beamforming based on the second configuration; and
hybrid means for performing hybrid beamforming based on the third configuration.

23. The apparatus of claim 19, wherein:
the first set of the at least four dedicated transceiver paths comprises at least two dedicated transceiver paths of the at least four dedicated transceiver paths; and
the second set of the at least four dedicated transceiver paths comprises at least two other dedicated transceiver paths of the at least four dedicated transceiver paths.

24. A method for operating a flexible beamforming architecture, the method comprising:
coupling, based on a first configuration, at least four dedicated transceiver paths of a radio-frequency integrated circuit to one of at least four intermediate transceiver paths of the radio-frequency integrated circuit;
operating an analog beamformer in an active state based on the first configuration;
connecting, based on a second configuration, each one of the at least four dedicated transceiver paths to a respective intermediate transceiver path of the at least four intermediate transceiver paths of the radio-frequency integrated circuit;
operating a digital beamformer in the active state based on the second configuration;

coupling, based on a third configuration, a first set of the at least four dedicated transceiver paths of the radio-frequency integrated circuit to a first intermediate transceiver path of the at least four intermediate transceiver paths;
coupling, based on the third configuration, a second set of the at least four dedicated transceiver paths of the radio-frequency integrated circuit to a second intermediate transceiver path of the at least four intermediate transceiver paths; and
operating a hybrid beamformer in the active state based on the third configuration.

25. The method of claim 24, wherein:
the operating the hybrid beamformer comprises operating the analog beamformer in the active state and a portion of the digital beamformer in the active state based on the third configuration.

26. An apparatus comprising:
a set of dedicated transceiver paths comprising:
a first dedicated transceiver path;
a second dedicated transceiver path;
a third dedicated transceiver path; and
a fourth dedicated transceiver path;
a set of intermediate transceiver paths comprising:
a first intermediate transceiver path;
a second intermediate transceiver path;
a third intermediate transceiver path; and
a fourth intermediate transceiver path; and
a flexible beamforming network coupled between the set of dedicated transceiver paths and the set of intermediate transceiver paths, the flexible beamforming network comprising:
a first coupler circuit coupled to the first intermediate transceiver path;
a first dedicated switch comprising:
a first pole coupled to the first dedicated transceiver path;
a first throw coupled to the first coupler circuit; and
a second throw coupled to the first intermediate transceiver path;
a second dedicated switch comprising:
a second pole coupled to the second dedicated transceiver path;
a third throw coupled to the first coupler circuit; and
a fourth throw coupled to the second intermediate transceiver path
a second coupler circuit coupled to the first throw of the first dedicated switch and the third throw of the second dedicated switch;
a third coupler circuit;
a third dedicated switch comprising:
a third pole coupled to the third dedicated transceiver path;
a fifth throw coupled to the third coupler circuit; and
a sixth throw coupled to the third intermediate transceiver path;
a fourth dedicated switch comprising:
a fourth pole coupled to the fourth dedicated transceiver path;
a seventh throw coupled to the third coupler circuit; and
an eighth throw coupled to the fourth intermediate transceiver path;
a first intermediate switch comprising:
a fifth pole coupled to the second coupler circuit;
a ninth throw coupled to the first intermediate transceiver path; and
a tenth throw coupled to the first coupler circuit; and
a second intermediate switch comprising:
a sixth pole coupled to the third coupler circuit;
an eleventh throw coupled to the second intermediate transceiver path; and
a twelfth throw coupled to the first coupler circuit.

27. The apparatus of claim 26, further comprising:
an antenna array comprising:
a first feed port coupled to the first dedicated transceiver path;
a second feed port coupled to the second dedicated transceiver path;
a third feed port coupled to the third dedicated transceiver path; and
a fourth feed port coupled to the fourth dedicated transceiver path,
wherein the first feed port, the second feed port, the third feed port, and the fourth feed port are associated with a same polarization.

28. The apparatus of claim 26, wherein:
the set of dedicated transceiver paths comprises a fifth dedicated transceiver path and a sixth intermediate path;
the set of intermediate transceiver paths comprises a fifth intermediate path and a sixth intermediate path; and
the flexible beamforming network comprises:
a fourth coupler circuit coupled to the second intermediate transceiver path;
a fifth coupler circuit;
a fifth dedicated switch comprising:
a seventh pole coupled to the fifth dedicated transceiver path;
a thirteenth throw coupled to the fifth coupler circuit; and
a fourteenth throw coupled to the first intermediate transceiver path; and
a sixth dedicated switch comprising:
an eighth pole coupled to the sixth dedicated transceiver path;
a fifteenth throw coupled to the fifth coupler circuit; and
a sixteenth throw coupled to the second intermediate transceiver path.

29. The apparatus of claim 28, further comprising:
an antenna array comprising:
a first feed port coupled to the first dedicated transceiver path;
a second feed port coupled to the second dedicated transceiver path;
a third feed port coupled to the fifth dedicated transceiver path; and
a fourth feed port coupled to the sixth dedicated transceiver path,
wherein:
the first feed port and the second feed port are associated with a first polarization; and
the fifth feed port and the sixth feed port are associated with a second polarization.

30. The apparatus of claim 29, wherein the antenna array comprises:
a first antenna element comprising the first feed port and the fifth feed port; and
a second antenna element comprising the second feed port and the sixth feed port.

* * * * *